United States Patent
Huang et al.

(10) Patent No.: US 10,374,722 B2
(45) Date of Patent: Aug. 6, 2019

(54) SIGNAL TRANSMITTING METHOD, SIGNAL RECEIVING METHOD, AND RELATED DEVICE AND SYSTEM

(71) Applicant: HUAWEI TECHNOLOGIES CO., LTD., Shenzhen, Guangdong (CN)

(72) Inventors: Yuanda Huang, Shenzhen (CN); Liangchuan Li, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/982,930

(22) Filed: May 17, 2018

(65) Prior Publication Data

US 2018/0287708 A1  Oct. 4, 2018

Related U.S. Application Data

(63) Continuation of application No. PCT/CN2015/094923, filed on Nov. 18, 2015.

(51) Int. Cl.
*H04B 10/516* (2013.01)
*H04B 7/216* (2006.01)
(Continued)

(52) U.S. Cl.
CPC ....... *H04B 10/5161* (2013.01); *H04B 1/7087* (2013.01); *H04B 7/216* (2013.01); *H04B 10/2507* (2013.01); *H04B 10/50* (2013.01); *H04B 10/5053* (2013.01); *H04B 10/54* (2013.01); *H04B 10/697* (2013.01); *H04J 14/005* (2013.01); *H04L 27/34* (2013.01); *H04L 27/366* (2013.01); *H04B 10/2569* (2013.01); *H04B 2201/709709* (2013.01)

(58) Field of Classification Search
None
See application file for complete search history.

(56) References Cited

U.S. PATENT DOCUMENTS

| 8,792,789 B1 * | 7/2014 | Varadarajan ....... H04B 10/6161 398/159 |
| 2002/0114035 A1 * | 8/2002 | Graves ................ H04J 14/0212 398/19 |

(Continued)

FOREIGN PATENT DOCUMENTS

| CN | 1972161 A | 5/2007 | |
| CN | 101867435 A * | 10/2010 | ............. H04J 14/02 |

(Continued)

OTHER PUBLICATIONS

S. Chandrasekhar et al, Terabit Superchannels for High Spectral Efficiency Transmission. ECOC 2010, Sep. 19-23, 2010, Torino, Italy, 6 pages.

*Primary Examiner* — Li Liu
(74) *Attorney, Agent, or Firm* — Womble Bond Dickinson (US) LLP

(57) ABSTRACT

According to a signal transmitting method, a signal receiving method, and a related device and system, a generated single-wavelength optical carrier may be split into N subcarriers with a same wavelength by using a splitting device, corresponding data modulation and corresponding amplitude spread spectrum modulation are performed on the N subcarriers by using N spreading codes and N low-speed data signals obtained by deserializing a received high-speed data signal, to obtain N spread spectrum modulation signals, and the N spread spectrum modulation signals are combined and output. A multicarrier generation apparatus or the like having a relatively complex structure does not need to be used for optical carrier splitting, and spectrum spreading does not need to be performed in a phase modulation manner in which a plurality of delay units or controllable phase units are required.

19 Claims, 11 Drawing Sheets

(51) Int. Cl.
    *H04B 10/69*     (2013.01)
    *H04B 10/50*     (2013.01)
    *H04L 27/34*     (2006.01)
    *H04B 1/7087*     (2011.01)
    *H04B 10/2507*     (2013.01)
    *H04L 27/36*     (2006.01)
    *H04B 10/54*     (2013.01)
    *H04J 14/00*     (2006.01)
    *H04B 10/2569*     (2013.01)

(56) References Cited

U.S. PATENT DOCUMENTS

| | | |
|---|---|---|
| 2003/0011838 A1 | 1/2003 | Sasaki et al. |
| 2004/0208644 A1* | 10/2004 | Sirat ................ H04B 10/2575 398/186 |
| 2005/0019040 A1* | 1/2005 | Trutna, Jr. ......... H04B 10/5053 398/183 |
| 2006/0171722 A1* | 8/2006 | Toliver ............... H04B 10/5055 398/188 |
| 2006/0215956 A1 | 9/2006 | Adachi et al. |
| 2007/0122161 A1* | 5/2007 | Charlet ................ G02F 1/0123 398/188 |
| 2011/0097079 A1 | 4/2011 | Hanawa |
| 2011/0176815 A1 | 7/2011 | Frankel et al. |

FOREIGN PATENT DOCUMENTS

| | | |
|---|---|---|
| CN | 102263726 A | 11/2011 |
| CN | 103457902 A | 12/2013 |
| CN | 103501186 A | 1/2014 |
| EP | 2385637 B1 | 12/2013 |
| WO | 0243298 A1 | 5/2002 |

\* cited by examiner

SIGNAL TRANSMITTING METHOD, SIGNAL RECEIVING METHOD, AND RELATED DEVICE AND SYSTEM

CROSS-REFERENCE TO RELATED APPLICATIONS

This application is a continuation of International Application No. PCT/CN2015/094923, filed on Nov. 18, 2015, the disclosure of which is hereby incorporated by reference in its entirety.

TECHNICAL FIELD

The present invention relates to the communications field, and in particular, to a signal transmitting method, a signal receiving method, and a related device and system.

BACKGROUND

Because of transmission distortion, a transmission loss, and the like, long-distance transmission is usually unsuitable for a baseband signal on various channels. To enable long-distance transmission of the baseband signal on various channels, corresponding carrier modulation needs to be performed on the baseband signal, so that the baseband signal is transmitted on a signal spectrum of a high frequency, and the baseband signal becomes a signal suitable for long-distance channel transmission.

Specifically, carrier modulation may be currently performed in a digital modulation manner such as Quadrature Phase Shift Keying (QPSK) or Quadrature Amplitude Modulation (16QAM). In addition, with successive commercial use of the QPSK and the 16QAM, and a continuously increasing transmission capacity requirement, signal modulation starts to be performed by using higher-order QAM. However, anti-noise performance of the higher-order QAM is far poorer than that of the QPSK and that of the 16QAM. Therefore, when quantization noise is relatively great because a currently commercial high-speed Digital-to-Analog Converter (DAC) has a relatively small ENOB (Effective Number of Bits, effective number of bits), back-to-back BER (Bit Error Rate, bit error rate) performance of the higher-order QAM is quite poor, and a signal basically cannot be transmitted. Consequently, system reliability of the higher-order QAM is relatively low.

To improve the system reliability of the higher-order QAM, currently, a signal is usually processed and transmitted by using transmitters of the following two structures in the industry:

Transmitter 1: As shown in FIG. 1, the transmitter may include a light source, a multicarrier generation apparatus, a demultiplexer, a polarization multiplexing In-phase Quadrature (IQ) modulator, a coupler, and the like. A working principle of the transmitter is as follows: The light source generates a consecutive optical carrier with a specified wavelength, the multicarrier generation apparatus converts the consecutive optical carrier into optical carriers with a plurality of wavelengths, the demultiplexer demultiplexes the optical carriers to generate a plurality of subcarriers, the polarization multiplexing IQ modulator performs polarization multiplexing IQ modulation on each subcarrier based on a plurality of low-speed baseband IQ signals obtained by performing corresponding conversion on a high-speed data signal, and the coupler combines and outputs all modulation subcarrier signals.

That is, a data signal with a high Baud rate may be changed into a plurality of data signals with a low Baud rate in a manner of multiplexing a plurality of subcarriers, so that only a low-bandwidth device (for example, a low-bandwidth DAC and another low-bandwidth electrical device) needs to process and transmit a corresponding data signal. The low-bandwidth DAC usually obtains a relatively high ENOB in a relatively easy manner, and therefore has relatively small quantization noise. In addition, the another low-bandwidth electrical device usually has relatively small electrical noise. Therefore, this manner can improve system reliability of the higher-order QAM. However, the multicarrier generation apparatus and the demultiplexer that are required in this manner can still be implemented only in a relatively complex and high-cost manner. Therefore, this manner cannot really achieve a commercial purpose because of problems such as complex implementation and high costs.

Transmitter 2: As shown in FIG. 2, the transmitter may include a pulsed light source, a Differential Phase Shift Keying (DPSK) encoder, a phase modulator, a spectral phase encoder, and the like. A working principle of the transmitter is as follows: The DPSK encoder generates a differentially coded signal according to an input signal, and outputs the differentially coded signal to the phase modulator, the phase modulator performs, according to the differentially coded signal, phase modulation on an optical carrier generated by the pulsed light source, and outputs a modulation signal to the spectral phase encoder, and the spectral phase encoder performs phase modulation on the modulation signal to implement spectrum spreading. Specifically, when performing phase modulation, the spectral phase encoder needs to divide the signal into a plurality of spectral components, and perform phase modulation on each spectral component according to different optical phase shifts. Each optical phase shift is usually generated by a plurality of delay units, or generated by a controllable phase unit including lithium niobate or other electro-optic material equivalent to lithium niobate.

That is, the spectral phase encoder may perform phase modulation on the modulation signal, so as to implement spectrum spreading, and improve QAM system reliability. However, in this method, a plurality of delay units or controllable phase units are usually required to generate a corresponding optical phase shift, so as to implement spectrum spreading. Consequently, this method cannot really achieve a commercial purpose because of relatively complex implementation and relatively high costs.

In conclusion, problems such as relatively high costs and a relatively great difficulty in implementation exist in an existing manner of improving QAM system reliability. Therefore, a new manner is urgently required to resolve the foregoing problems.

SUMMARY

Embodiments of the present invention provide a signal transmitting method, a signal receiving method, and a related device and system, so as to resolve problems such as relatively high costs and a relatively great difficulty in implementation that exist in an existing manner of improving QAM system reliability.

According to a first aspect, a signal transmitting method is provided, including:

generating a single-wavelength optical carrier;

splitting the single-wavelength optical carrier into N subcarriers with a same wavelength based on a splitting device, where a value of N is a positive integer not less than 2;

performing data modulation and amplitude spread spectrum modulation on the N subcarriers according to N low-speed data signals and N spreading codes, to obtain N spread spectrum modulation signals, where the N spreading codes are in a one-to-one correspondence with the N subcarriers, the N low-speed data signals are in a one-to-one correspondence with the N subcarriers, and the N low-speed data signals are obtained by deserializing a received high-speed data signal; and combining the obtained N spread spectrum modulation signals into a combined signal for outputting.

With reference to the first aspect, in a first possible implementation of the first aspect, the performing data modulation and amplitude spread spectrum modulation on the N subcarriers according to N low-speed data signals and N spreading codes, to obtain N spread spectrum modulation signals includes:

performing data modulation on each of the N subcarriers according to a low-speed data signal corresponding to the subcarrier, to obtain a data modulation signal; and performing amplitude spread spectrum modulation on the data modulation signal according to a spreading code corresponding to the subcarrier, to obtain a spread spectrum modulation signal corresponding to the subcarrier.

With reference to the first aspect, in a second possible implementation of the first aspect, the performing data modulation and amplitude spread spectrum modulation on the N subcarriers according to N low-speed data signals and N spreading codes, to obtain N spread spectrum modulation signals includes:

performing amplitude spread spectrum modulation on each of the N subcarriers according to a spreading code corresponding to the subcarrier, to obtain a spread spectrum signal; and performing data modulation on the spread spectrum signal according to a low-speed data signal corresponding to the subcarrier, to obtain a spread spectrum modulation signal corresponding to the subcarrier.

With reference to the first aspect, in a third possible implementation of the first aspect, the performing data modulation and amplitude spread spectrum modulation on the N subcarriers according to N low-speed data signals and N spreading codes, to obtain N spread spectrum modulation signals includes:

splitting each of the N subcarriers into a first tributary subcarrier and a second tributary subcarrier, and separately performing phase shifting on the first tributary subcarrier and the second tributary subcarrier;

performing data modulation on the first tributary subcarrier according to a low-speed data signal corresponding to the subcarrier, to obtain a first tributary data modulation signal, and performing amplitude spread spectrum modulation on the first tributary data modulation signal according to a spreading code corresponding to the subcarrier, to obtain a first tributary spread spectrum modulation signal; and performing data modulation on the second tributary subcarrier according to a low-speed data signal that is obtained after the phase reversion and that is corresponding to the subcarrier, to obtain a second tributary data modulation signal, and performing amplitude spread spectrum modulation on the second tributary data modulation signal according to a spreading code that is obtained after the phase reversion and that is corresponding to the subcarrier, to obtain a second tributary spread spectrum modulation signal; and combining the first tributary spread spectrum modulation signal and the second tributary spread spectrum modulation signal, to obtain a spread spectrum modulation signal corresponding to the subcarrier.

With reference to the first aspect, in a fourth possible implementation of the first aspect, the performing data modulation and amplitude spread spectrum modulation on the N subcarriers according to N low-speed data signals and N spreading codes, to obtain N spread spectrum modulation signals includes:

splitting each of the N subcarriers into a first tributary subcarrier and a second tributary subcarrier, and separately performing phase shifting on the first tributary subcarrier and the second tributary subcarrier;

performing amplitude spread spectrum modulation on the first tributary subcarrier according to a spreading code corresponding to the subcarrier, to obtain a first tributary spread spectrum signal, and performing data modulation on the first tributary spread spectrum signal according to a low-speed data signal corresponding to the subcarrier, to obtain a first tributary spread spectrum modulation signal; and performing amplitude spread spectrum modulation on the second tributary subcarrier according to a spreading code that is obtained after the phase reversion and that is corresponding to the subcarrier, to obtain a second tributary spread spectrum signal, and performing data modulation on the second tributary spread spectrum signal according to a low-speed data signal that is obtained after the phase reversion and that is corresponding to the subcarrier, to obtain a second tributary spread spectrum modulation signal; and combining the first tributary spread spectrum modulation signal and the second tributary spread spectrum modulation signal, to obtain a spread spectrum modulation signal corresponding to the subcarrier.

According to a second aspect, a signal receiving method is provided, including:

receiving a signal transmitted by a signal transmit device, where the signal transmit device splits a generated single-wavelength optical carrier into N subcarriers with a same wavelength by using a splitting device, and performs data modulation and amplitude spread spectrum modulation on the N subcarriers based on N low-speed data signals and N spreading codes, to obtain N spread spectrum modulation signals, and the signal transmit device combines the N spread spectrum modulation signals, to obtain the signal;

performing optical-to-electrical conversion processing and analog-to-digital conversion processing on the received signal, to obtain a digital signal; and despreading the digital signal based on the N spreading codes, to obtain N despread signals, and performing low-pass filtering on each of the N despread signals, to obtain N data signals, where N is a positive integer not less than 2.

With reference to the second aspect, in a first possible implementation of the second aspect, the method further includes:

performing adaptive filtering on each of the N data signals, to obtain N data signals obtained after the adaptive filtering.

With reference to the second aspect, in a second possible implementation of the second aspect, the method further includes:

performing carrier phase retrieval on each of the data signals obtained after the adaptive filtering, to obtain N data signals obtained after the carrier phases retrieval.

With reference to the second aspect, in a third possible implementation of the second aspect, before the despreading the digital signal, the method further includes:

performing dispersion compensation on the digital signal.

According to a third aspect, a signal transmit device is provided, where the device includes a light source, a deserializer, a first splitting device, a first combining device, and N spread spectrum modulation devices; and a value of N is a positive integer not less than 2, where the light source is configured to: generate a single-wavelength optical carrier, and output the single-wavelength optical carrier to the first splitting device;

the deserializer is configured to: deserialize a received high-speed data signal into N low-speed data signals, and output the N low-speed data signals to the N spread spectrum modulation devices, where the N low-speed data signals are in a one-to-one correspondence with the N spread spectrum modulation devices;

the first splitting device is configured to: split the single-wavelength optical carrier generated by the light source into N subcarriers with a same wavelength, and output the N subcarriers to the N spread spectrum modulation devices, where the N subcarriers are in a one-to-one correspondence with the N spread spectrum modulation devices;

each of the N spread spectrum modulation devices is configured to: respectively perform, according to a low-speed data signal corresponding to the spread spectrum modulation device and a spreading code in N spreading codes that is corresponding to the spread spectrum modulation device, data modulation and amplitude spread spectrum modulation on a subcarrier corresponding to the spread spectrum modulation device, to obtain a spread spectrum modulation signal corresponding to the spread spectrum modulation device, and output the spread spectrum modulation signal to the first combining device, where the N spreading codes are in a one-to-one correspondence with the N spread spectrum modulation devices; and the first combining device is configured to combine N spread spectrum modulation signals received from the N spread spectrum modulation devices into a combined signal for outputting.

With reference to the third aspect, in a first possible implementation of the first aspect, any of the N spread spectrum modulation devices is specifically configured to:

perform, according to a low-speed data signal corresponding to the spread spectrum modulation device, data modulation on a subcarrier corresponding to the spread spectrum modulation device, to obtain a data modulation signal, perform amplitude spread spectrum modulation on the data modulation signal according to a spreading code corresponding to the spread spectrum modulation device, to obtain a spread spectrum modulation signal corresponding to the spread spectrum modulation device, and output the spread spectrum modulation signal to the first combining device.

With reference to the third aspect, in a second possible implementation of the third aspect, any of the N spread spectrum modulation devices is specifically configured to:

perform, according to a spreading code corresponding to the spread spectrum modulation device, amplitude spread spectrum modulation on a subcarrier corresponding to the spread spectrum modulation device, to obtain a spread spectrum signal, perform data modulation on the spread spectrum signal according to a low-speed data signal corresponding to the spread spectrum modulation device, to obtain a corresponding spread spectrum modulation signal, and output the spread spectrum modulation signal to the first combining device.

With reference to the third aspect, in a third possible implementation of the third aspect, any of the N spread spectrum modulation devices is specifically configured to:

split a subcarrier corresponding to the spread spectrum modulation device into a first tributary subcarrier and a second tributary subcarrier, and separately perform phase shifting on the first tributary subcarrier and the second tributary subcarrier; and perform data modulation on the first tributary subcarrier according to a low-speed data signal corresponding to the spread spectrum modulation device, to obtain a first tributary data modulation signal, and perform amplitude spread spectrum modulation on the first tributary data modulation signal according to a spreading code corresponding to the spread spectrum modulation device, to obtain a first tributary spread spectrum modulation signal; perform data modulation on the second tributary subcarrier according to a low-speed data signal that is obtained after the phase reversion and that is corresponding to the spread spectrum modulation device, to obtain a second tributary data modulation signal, and perform amplitude spread spectrum modulation on the second tributary data modulation signal according to a spreading code that is obtained after the phase reversion and that is corresponding to the spread spectrum modulation device, to obtain a second tributary spread spectrum modulation signal; and combine the first tributary spread spectrum modulation signal and the second tributary spread spectrum modulation signal, to obtain a spread spectrum modulation signal corresponding to the spread spectrum modulation device, and output the spread spectrum modulation signal to the first combining device.

With reference to the third aspect, in a fourth possible implementation of the third aspect, any of the N spread spectrum modulation devices is specifically configured to:

split a subcarrier corresponding to the spread spectrum modulation device into a first tributary subcarrier and a second tributary subcarrier, and separately perform phase shifting on the first tributary subcarrier and the second tributary subcarrier; and perform amplitude spread spectrum modulation on the first tributary subcarrier according to a spreading code corresponding to the spread spectrum modulation device, to obtain a first tributary spread spectrum signal, and perform data modulation on the first tributary spread spectrum signal according to a low-speed data signal corresponding to the spread spectrum modulation device, to obtain a first tributary spread spectrum modulation signal; perform amplitude spread spectrum modulation on the second tributary subcarrier according to a spreading code that is obtained after the phase reversion and that is corresponding to the spread spectrum modulation device, to obtain a second tributary spread spectrum signal, and perform data modulation on the second tributary spread spectrum signal according to a low-speed data signal that is obtained after the phase reversion and that is corresponding to the spread spectrum modulation device, to obtain a second tributary spread spectrum modulation signal; and combine the first tributary spread spectrum modulation signal and the second tributary spread spectrum modulation signal, to obtain a spread spectrum modulation signal corresponding to the spread spectrum modulation device, and output the spread spectrum modulation signal to the first combining device.

With reference to the third aspect, in a fifth possible implementation of the third aspect, the N spreading codes are mutually orthogonal bipolar binary spread spectrum sequences.

According to a fourth aspect, a signal receiving device is provided, including an OEC (Optical-to-Electrical Converter, optical-to-electrical converter), an ADC (Analog to Digital Converter, analog to digital converter), and a DSP (Digital Signal Processor, digital signal processor), where the OEC is configured to: receive a signal transmitted by a signal transmit device, convert the received signal into an electrical signal, and output the electrical signal to the ADC, where the signal transmit device splits, by using a splitting device, a single-wavelength optical carrier generated by a light source into N subcarriers with a same wavelength, performs data modulation and amplitude spread spectrum modulation on the N subcarriers based on N low-speed data signals and N spreading codes, to obtain N spread spectrum modulation signals, and the signal transmit device combines the N spread spectrum modulation signals, to obtain the signal;

the ADC is configured to: receive the electrical signal output by the OEC, convert the electrical signal into a digital signal, and output the digital signal to the DSP; and the DSP is configured to: receive the digital signal output by the ADC, despread the digital signal based on the N spreading codes, to obtain N despread signals, and perform low-pass filtering on each of the N despread signals, to obtain N data signals, where N is a positive integer not less than 2.

With reference to the fourth aspect, in a first possible implementation of the fourth aspect, the DSP further includes a multiple-input multiple-output filter, where the multiple-input multiple-output filter is configured to perform adaptive filtering on each of the N data signals, to obtain N data signals obtained after the adaptive filtering.

With reference to the fourth aspect, in a second possible implementation of the fourth aspect, the DSP further includes N phase retrieval devices that are in a one-to-one correspondence with the N data signals obtained after the adaptive filtering, where each of the N phase retrieval devices is configured to perform carrier phase retrieval on a data signal that is obtained after the adaptive filtering and that is corresponding to the phase retrieval device, to obtain a data signal obtained after the carrier phase retrieval.

With reference to the fourth aspect, in a third possible implementation of the fourth aspect, the DSP further includes a dispersion compensator, where the dispersion compensator is configured to: perform dispersion compensation on the received digital signal before the received digital signal is despread, and output a digital signal obtained after the dispersion compensation to the N despreaders.

According to a fifth aspect, a signal transmission system is provided, including a signal transmit device and a signal receiving device, where the signal transmit device is configured to: generate a single-wavelength optical carrier; split the single-wavelength optical carrier into N subcarriers with a same wavelength based on a splitting device; perform data modulation and amplitude spread spectrum modulation on the N subcarriers according to N low-speed data signals and N spreading codes, to obtain N spread spectrum modulation signals; combine the obtained N spread spectrum modulation signals into a combined signal; and output the combined signal to the signal receiving device, where a value of N is a positive integer not less than 2, the N spreading codes are in a one-to-one correspondence with the N subcarriers, the N low-speed data signals are in a one-to-one correspondence with the N subcarriers, and the N low-speed data signals are obtained by deserializing a received high-speed data signal; and the signal receiving device is configured to: receive a signal transmitted by the signal transmit device; perform optical-to-electrical conversion processing and analog-to-digital conversion processing on the received signal, to obtain a digital signal; despread the digital signal based on the N spreading codes, to obtain N despread signals; and perform low-pass filtering on each of the N despread signals, to obtain N data signals.

According to the signal transmitting method, the signal receiving method, and the related device and system that are provided in the first aspect to the fifth aspect, the generated single-wavelength optical carrier may be split into N subcarriers with a same wavelength by using the splitting device, corresponding data modulation and corresponding amplitude spread spectrum modulation are performed on the N subcarriers by using the N spreading codes and the N low-speed data signals obtained by deserializing the received high-speed data signal, to obtain the N spread spectrum modulation signals, and the N spread spectrum modulation signals are combined and output. Because a Baud rate of each data signal may be reduced through multiplexing, the data signal may be processed by using a low-speed DAC with a high ENOB and another electrical device with a low bandwidth, so as to effectively reduce quantization noise of the ADC and electrical noise of the another electrical device, and improve system performance of higher-order QAM modulation. In addition, in the solutions, a multicarrier generation apparatus and a demultiplexer that have a relatively complex structure do not need to be used for optical carrier splitting, and spectrum spreading does not need to be performed in a phase modulation manner in which a plurality of delay units or controllable phase units are required. Therefore, system reliability is improved, and problems such as relatively high costs and a relatively great difficulty in implementation that exist in an existing manner of improving QAM system reliability are effectively resolved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

Embodiment 1

Figure 1:
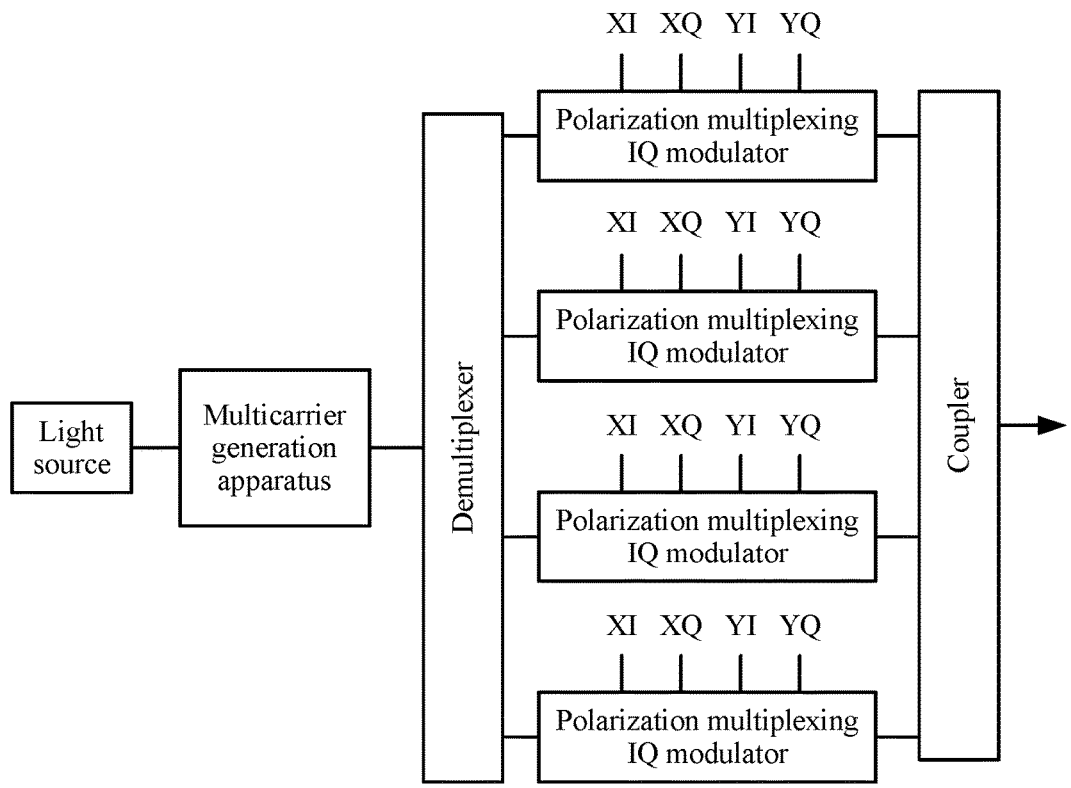
FIG. 1 is a schematic structural diagram of a transmitter according to the first prior art.
Figure 2:
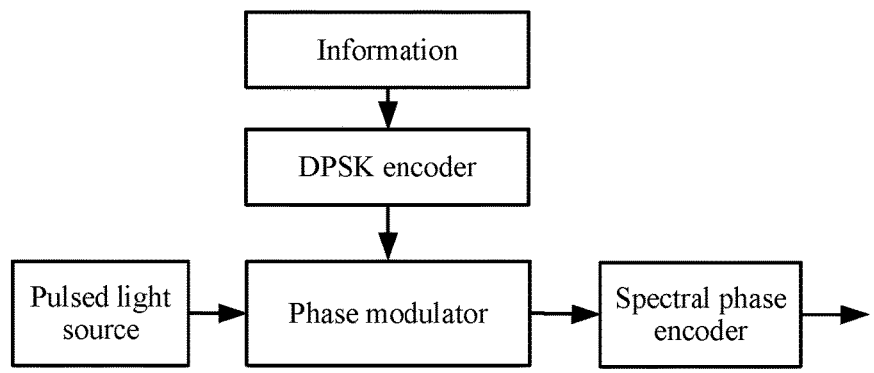
FIG. 2 is a schematic structural diagram of a transmitter according to the second prior art.
Figure 3:
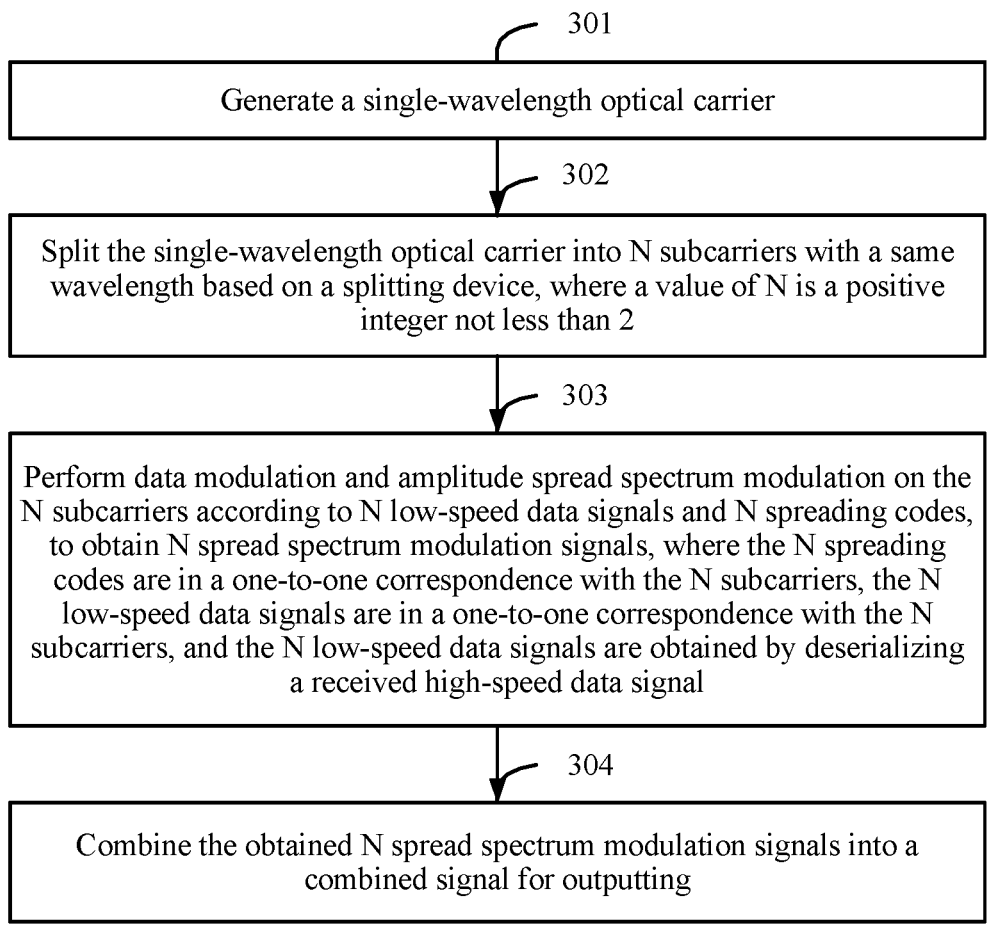
FIG. 3 is a schematic flowchart of a signal transmitting method according to Embodiment 1 of the present invention.

To resolve problems such as relatively high costs and a relatively great difficulty in implementation that exist in an existing manner of improving QAM system reliability, Embodiment 1 of the present invention provides a signal transmitting method. Specifically, as shown in FIG. 3, FIG. 3 is a schematic flowchart of a signal transmitting method according to Embodiment 1 of the present invention. The signal transmitting method may specifically include the following steps:

Step 301: Generate a single-wavelength optical carrier.

Step 302: Split the single-wavelength optical carrier into N subcarriers with a same wavelength based on a splitting device, where a value of N is a positive integer not less than 2.

Step 303: Perform data modulation and amplitude spread spectrum modulation on the N subcarriers according to N low-speed data signals and N spreading codes, to obtain N spread spectrum modulation signals, where the N spreading codes are in a one-to-one correspondence with the N subcarriers, the N low-speed data signals are in a one-to-one correspondence with the N subcarriers, and the N low-speed data signals are obtained by deserializing a received high-speed data signal.

Step 304: Combine the obtained N spread spectrum modulation signals into a combined signal for outputting.

That is, after the single-wavelength optical carrier is generated, the single-wavelength optical carrier may be split into the N subcarriers with a same wavelength by using the splitting device, data modulation and amplitude spread spectrum modulation are performed on the N subcarriers according to the N low-speed data signals and the N spreading codes, to obtain the N spread spectrum modulation signals, and the N spread spectrum modulation signals are combined into the combined signal for outputting. Because a Baud rate of each data signal may be reduced through multiplexing, the data signal may be processed by using a low-speed DAC with a high ENOB and another electrical device with a low bandwidth, so as to effectively reduce quantization noise of the ADC and electrical noise of the another electrical device, and improve system performance of higher-order QAM modulation. In addition, in the solution of this embodiment of the present invention, the optical carrier may be split by using the splitting device with a relatively simple structure, and a multicarrier generation apparatus or the like having a relatively complex structure does not to be used. In addition, spectrum spreading does not need to be performed in a phase modulation manner in which a plurality of delay units or controllable phase units are required. Therefore, system reliability is improved, and problems such as relatively high costs and a relatively great difficulty in implementation that exist in an existing manner of improving system reliability are resolved.

Specifically, the splitting device may be any splitting device that can split a single-wavelength optical carrier into a plurality of subcarriers with a same wavelength, for example, a coupler or a splitter. This is not limited in this embodiment of the present invention.

Optionally, the performing data modulation and amplitude spread spectrum modulation on the N subcarriers according to N low-speed data signals and N spreading codes, to obtain N spread spectrum modulation signals may be performed as:

performing data modulation on each of the N subcarriers according to a low-speed data signal corresponding to the subcarrier, to obtain a data modulation signal; and performing amplitude spread spectrum modulation on the data modulation signal according to a spreading code corresponding to the subcarrier, to obtain a spread spectrum modulation signal corresponding to the subcarrier.

Optionally, the performing data modulation and amplitude spread spectrum modulation on the N subcarriers according to N low-speed data signals and N spreading codes, to obtain N spread spectrum modulation signals may be performed as:

performing amplitude spread spectrum modulation on each of the N subcarriers according to a spreading code corresponding to the subcarrier, to obtain a spread spectrum signal; and performing data modulation on the spread spectrum signal according to a low-speed data signal corresponding to the subcarrier, to obtain a spread spectrum modulation signal corresponding to the subcarrier.

That is, a sequence of performing data modulation and amplitude spread spectrum modulation on each of the N subcarriers may flexibly change. For example, data modulation may be performed on the subcarrier before amplitude spread spectrum modulation, or amplitude spread spectrum modulation may be performed on the subcarrier before data modulation. This is not limited in this embodiment of the present invention.

Further, data modulation and spectrum spreading may be performed on any subcarrier that is used as a whole, to obtain a spread spectrum modulation signal. Alternatively, the subcarrier may be split into two tributary subcarriers for which data modulation and spectrum spreading are separately performed, to obtain two tributary spread spectrum modulation signals, and the two tributary spread spectrum modulation signals are combined and output, to obtain a spread spectrum modulation signal corresponding to the subcarrier.

That is, the performing data modulation and amplitude spread spectrum modulation on the N subcarriers according to N low-speed data signals and N spreading codes, to obtain N spread spectrum modulation signals may be performed as:

splitting each of the N subcarriers into a first tributary subcarrier and a second tributary subcarrier, and separately performing phase shifting on the first tributary subcarrier and the second tributary subcarrier, so that a phase difference between the two tributary subcarriers is a specified value (the specified value may be flexibly set according to an actual case, for example, may be set to 180 degrees);

performing data modulation on the first tributary subcarrier according to a low-speed data signal corresponding to the subcarrier, to obtain a first tributary data modulation signal, and performing amplitude spread spectrum modulation on the first tributary data modulation signal according to a spreading code corresponding to the subcarrier, to obtain a first tributary spread spectrum modulation signal; and performing data modulation on the second tributary subcarrier according to a low-speed data signal that is obtained after the phase reversion and that is corresponding to the subcarrier, to obtain a second tributary data modulation signal, and performing amplitude spread spectrum modulation on the second tributary data modulation signal according to a spreading code that is obtained after the phase reversion and that is corresponding to the subcarrier, to obtain a second tributary spread spectrum modulation signal; and combining the first tributary spread spectrum modulation signal and the second tributary spread spectrum modulation signal, to obtain a spread spectrum modulation signal corresponding to the subcarrier.

Further, after the splitting each of the N subcarriers into a first tributary subcarrier and a second tributary subcarrier, and separately performing phase shifting on the first tributary subcarrier and the second tributary subcarrier, so that a phase difference between the two tributary subcarriers is a specified value, data modulation and spectrum spreading may be performed on the two tributary subcarriers in the following manner, to obtain a spread spectrum modulation signal corresponding to the subcarrier:

performing amplitude spread spectrum modulation on the first tributary subcarrier according to a spreading code corresponding to the subcarrier, to obtain a first tributary spread spectrum signal, and performing data modulation on the first tributary spread spectrum signal according to a low-speed data signal corresponding to the subcarrier, to obtain a first tributary spread spectrum modulation signal; and performing amplitude spread spectrum modulation on the second tributary subcarrier according to a spreading code that is obtained after the phase reversion and that is corresponding to the subcarrier, to obtain a second tributary spread spectrum signal, and performing data modulation on the second tributary spread spectrum signal according to a low-speed data signal that is obtained after the phase reversion and that is corresponding to the subcarrier, to obtain a second tributary spread spectrum modulation signal; and combining the first tributary spread spectrum modulation signal and the second tributary spread spectrum modulation signal, to obtain a spread spectrum modulation signal corresponding to the subcarrier.

That is, a sequence of performing data modulation and amplitude spread spectrum modulation on each tributary subcarrier may flexibly change. This is not limited in this embodiment of the present invention.

It should be noted that, in an example in which the specified value is 180 degrees, the separately performing phase shifting on the first tributary subcarrier and the second tributary subcarrier, so that a phase difference between the two tributary subcarriers is a specified value may be specifically performed as:

keeping a phase of the first tributary subcarrier unchanged, and shifting only a phase of the second tributary subcarrier by 180 degrees or −180 degrees; or keeping a phase of the second tributary subcarrier unchanged, and shifting only a phase of the first tributary subcarrier by 180 degrees or −180 degrees; or certainly, shifting a phase of the first tributary subcarrier by 90 degrees, and shifting a phase of the second tributary subcarrier by −90 degrees; or shifting a phase of the first tributary subcarrier by −90 degrees, and shifting a phase of the second tributary subcarrier by 90 degrees, where there is a need to ensure that the phase difference between the two tributary subcarriers is 180 degrees, and details are not described in this embodiment of the present invention.

Further, it should be noted that in this embodiment of the present invention, the N spreading codes may be mutually orthogonal bipolar binary spread spectrum sequences.

For example, each of the N spreading codes may be a real number sequence such as a Walsh code or an OVSF code. Certainly, to obtain more evenly distributed spectrums, each spreading code may be a sequence code generated by scrambling the real number sequence such as the Walsh code or the OVSF code based on a specified pseudo-random sequence code, or the like. This is not limited in this embodiment of the present invention.

In addition, it should be noted that the signal transmitting method in this embodiment of the present invention may be usually performed by a corresponding signal transmit device. Details are not described in this embodiment of the present invention.

It may be learned from the content in Embodiment 1 of the present invention that the generated single-wavelength optical carrier may be split into the N subcarriers with a same wavelength by using the splitting device, corresponding data modulation and corresponding amplitude spread spectrum modulation are performed on the N subcarriers by using the N spreading codes and the N low-speed data signals obtained by deserializing the received high-speed data signal, to obtain the N spread spectrum modulation signals, and the N spread spectrum modulation signals are combined and output. Because a Baud rate of each data signal may be reduced through multiplexing, the data signal may be processed by using a low-speed DAC with a high ENOB and another electrical device with a low bandwidth, so as to effectively reduce quantization noise of the ADC and electrical noise of the another electrical device, and improve system performance of higher-order QAM modulation. In addition, in this solution, a multicarrier generation apparatus and a demultiplexer that have a relatively complex structure do not need to be used for optical carrier splitting, and spectrum spreading does not need to be performed in a phase modulation manner in which a plurality of delay units or controllable phase units are required. Therefore, system reliability is improved, and problems such as relatively high costs and a relatively great difficulty in implementation that exist in an existing manner of improving QAM system reliability are effectively resolved.

Embodiment 2

Figure 4:
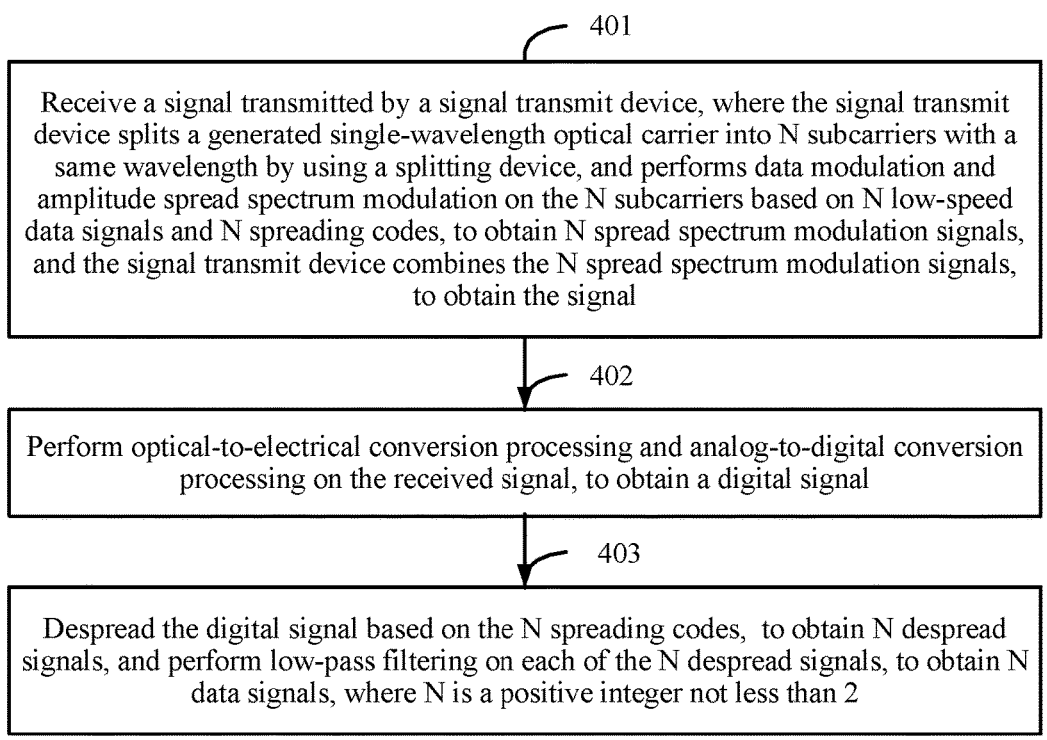
FIG. 4 is a schematic flowchart of a signal receiving method according to Embodiment 2 of the present invention.

Embodiment 2 of the present invention provides a signal receiving method. Specifically, as shown in FIG. 4, FIG. 4 is a schematic flowchart of a signal receiving method according to Embodiment 2 of the present invention. The signal receiving method may specifically include the following steps:

Step 401: Receive a signal transmitted by a signal transmit device, where the signal transmit device splits a generated single-wavelength optical carrier into N subcarriers with a same wavelength by using a splitting device, and performs data modulation and amplitude spread spectrum modulation on the N subcarriers based on N low-speed data signals and N spreading codes, to obtain N spread spectrum modulation signals, and the signal transmit device combines the N spread spectrum modulation signals, to obtain the signal.

Step 402: Perform optical-to-electrical conversion processing and analog-to-digital conversion processing on the received signal, to obtain a digital signal.

Step 403: Despread the digital signal based on the N spreading codes, to obtain N despread signals, and perform low-pass filtering on each of the N despread signals, to obtain N data signals, where N is a positive integer not less than 2.

That is, after the performing optical-to-electrical conversion processing and analog-to-digital conversion processing on the received signal, to obtain a digital signal, the digital signal may be despread based on the N spreading codes used by the signal transmit device for amplitude spread spectrum modulation, so as to improve accuracy of data recovery and receiving.

Optionally, the signal may be despread in a manner of multiplying each of the N spreading codes by the digital signal, to obtain the N despread signals. Details are not described herein.

It should be noted that the N spreading codes may be mutually orthogonal bipolar binary spread spectrum sequences.

Specifically, each of the N spreading codes may be a real number sequence such as a Walsh code or an OVSF code. Certainly, to obtain more-evenly distributed spectrums, each spreading code may be a sequence code generated by scrambling the real number sequence such as the Walsh code or the OVSF code based on a specified pseudo-random sequence code, or the like. This is not limited in this embodiment of the present invention.

Further, orthogonality between spreading codes may be damaged because of dispersion of a fiber link, PMD (Polarization mode dispersion, polarization mode dispersion), SOP (State of Polarization, state of polarization) rotation, nonlinearity, and the like. Consequently, multi-access crosstalk and the like are caused. Therefore, the method may further include:

performing adaptive filtering on each of the N data signals, to obtain N data signals obtained after the adaptive filtering, so as to improve accuracy of data recovery and receiving.

Further, the method may further include:

performing carrier phase retrieval on each of the N data signals obtained after the adaptive filtering, to obtain N data signals obtained after the carrier phase retrieval, so as to further improve accuracy of data recovery and receiving.

Further, before the despreading the digital signal, the method may further include:

performing dispersion compensation on the digital signal, to eliminate impact of dispersion on the digital signal, and further improve accuracy of data recovery and receiving.

Finally, it should be noted that the signal receiving method in Embodiment 2 of the present invention may be usually performed by a corresponding signal receiving device. Details are not described in this embodiment of the present invention.

Embodiment 3

Figure 5:
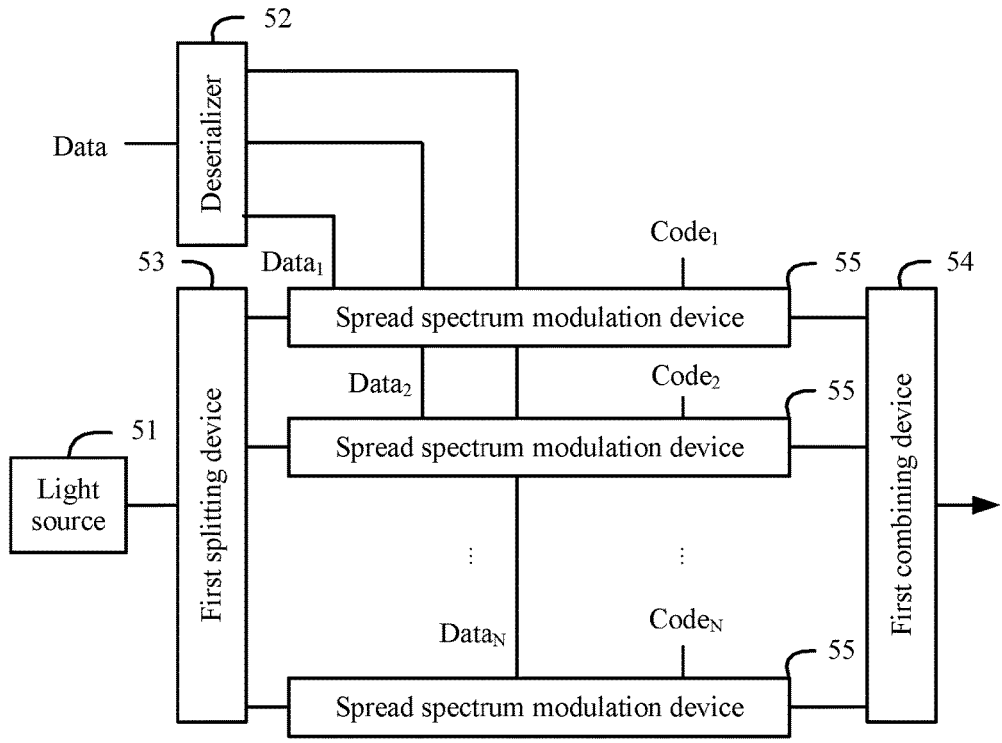
FIG. 5 is a schematic structural diagram of a signal transmit device according to Embodiment 3 of the present invention.

Based on an invention idea the same as that of Embodiment 1 of the present invention, Embodiment 3 of the present invention provides a signal transmit device. Specifically, as shown in FIG. 5, FIG. 5 is a schematic structural diagram of a signal transmit device according to Embodiment 3 of the present invention. It can be learned from FIG. 5 that the signal transmit device may include a light source 51, a deserializer 52, a first splitting device 53, a first combining device 54, and N spread spectrum modulation devices 55. A value of N is a positive integer not less than 2.

The light source 51 may be configured to: generate a single-wavelength optical carrier, and output the single-wavelength optical carrier to the first splitting device 53.

The deserializer 52 may be configured to: deserialize a received high-speed data signal into N low-speed data signals, and output the N low-speed data signals to the N spread spectrum modulation devices 55. The N low-speed data signals are in a one-to-one correspondence with the N spread spectrum modulation devices 55.

The first splitting device 53 may be configured to: split the single-wavelength optical carrier generated by the light source 51 into N subcarriers with a same wavelength, and output the N subcarriers to the N spread spectrum modulation devices 55, The N subcarriers are in a one-to-one correspondence with the N spread spectrum modulation devices 55.

Each of the N spread spectrum modulation devices 55 may be configured to: respectively perform, according to a low-speed data signal corresponding to the spread spectrum modulation device 55 and a spreading code in N spreading codes that is corresponding to the spread spectrum modulation device 55, data modulation and amplitude spread spectrum modulation on a subcarrier corresponding to the spread spectrum modulation device 55, to obtain a spread spectrum modulation signal corresponding to the spread spectrum modulation device 55, and output the spread spectrum modulation signal to the first combining device 54. The N spreading codes are in a one-to-one correspondence with the N spread spectrum modulation devices.

The first combining device 54 may be configured to combine N spread spectrum modulation signals received from the N spread spectrum modulation devices 55 into a combined signal for outputting.

That is, the generated single-wavelength optical carrier may be split into the N subcarriers with a same wavelength by using the splitting device, corresponding data modulation and corresponding amplitude spread spectrum modulation are performed on the N subcarriers by using the N spreading codes and the N low-speed data signals obtained by deserializing the received high-speed data signal, to obtain the N spread spectrum modulation signals, and the N spread spectrum modulation signals are combined and output. Because a Baud rate of each data signal may be reduced through multiplexing, the data signal may be processed by using a low-speed DAC with a high ENOB and another electrical device with a low bandwidth, so as to effectively reduce quantization noise of the ADC and electrical noise of the another electrical device, and improve system performance of higher-order QAM modulation. In addition, in the solution of this embodiment of the present invention, a multicarrier generation apparatus and a demultiplexer that have a relatively complex structure do not need to be used for optical carrier splitting, and spectrum spreading does not need to be performed in a phase modulation manner in which a plurality of delay units or controllable phase units are required. Therefore, system reliability is improved, and problems such as relatively high costs and a relatively great difficulty in implementation that exist in an existing manner of improving QAM system reliability are effectively resolved.

Specifically, the light source 51 may be any light source that can generate a single-wavelength optical carrier, for example, a single-wavelength LED light source or a laser light source. The first splitting device 53 may be any splitting device that can split a single-wavelength optical carrier into a plurality of subcarriers with a same wavelength, for example, a coupler or a splitter. The first combining device 54 may be any combining device that can combine N spread spectrum modulation signals into a spread spectrum modulation signal, for example a coupler or a combiner. This is not limited in this embodiment of the present invention.

Optionally, any of the N spread spectrum modulation devices 55 may be specifically configured to:

perform, according to a low-speed data signal corresponding to the spread spectrum modulation device 55, data modulation on a subcarrier corresponding to the spread spectrum modulation device 55, to obtain a data modulation signal, perform amplitude spread spectrum modulation on the data modulation signal according to a spreading code corresponding to the spread spectrum modulation device 55, to obtain a spread spectrum modulation signal corresponding to the spread spectrum modulation device 55, and output the spread spectrum modulation signal to the first combining device 54.

Optionally, any of the N spread spectrum modulation devices 55 may be further specifically configured to:

perform, according to a spreading code corresponding to the spread spectrum modulation device 55, amplitude spread spectrum modulation on a subcarrier corresponding to the spread spectrum modulation device 55, to obtain a spread spectrum signal, perform data modulation on the spread spectrum signal according to a low-speed data signal corresponding to the spread spectrum modulation device 55, to obtain a spread spectrum modulation signal corresponding to the spread spectrum modulation device 55, and output the spread spectrum modulation signal to the first combining device 54.

That is, by using a spread spectrum modulation device 55 corresponding to each subcarrier, data modulation may be performed on the subcarrier before amplitude spread spectrum modulation, or amplitude spread spectrum modulation may be performed on the subcarrier before data modulation, so as to improve data processing flexibility. Details are not described herein.

Figure 6:
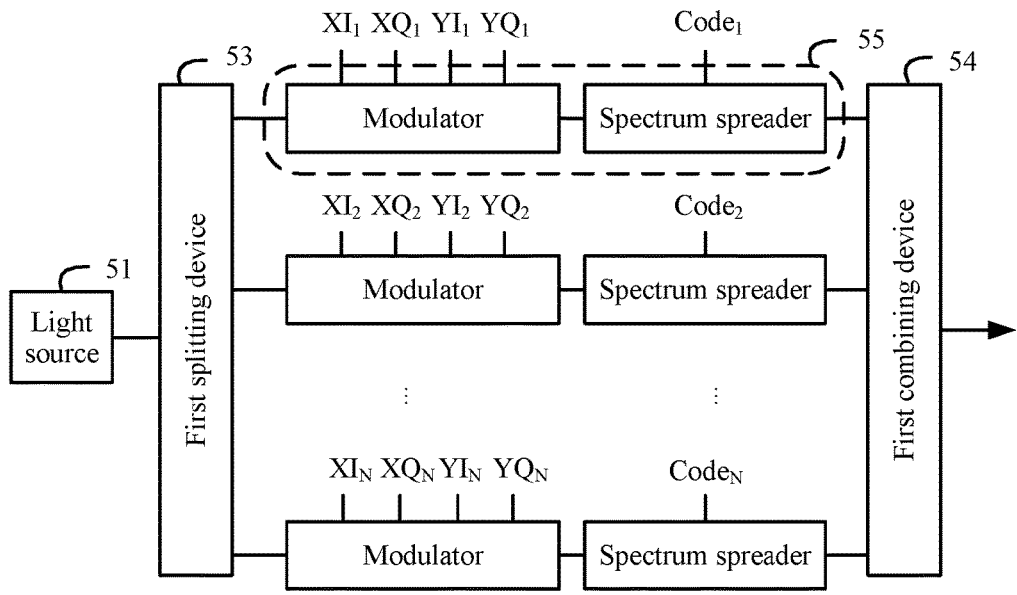
FIG. 6 is a schematic structural diagram of a first signal transmit device according to Embodiment 3 of the present invention.
Figure 7:
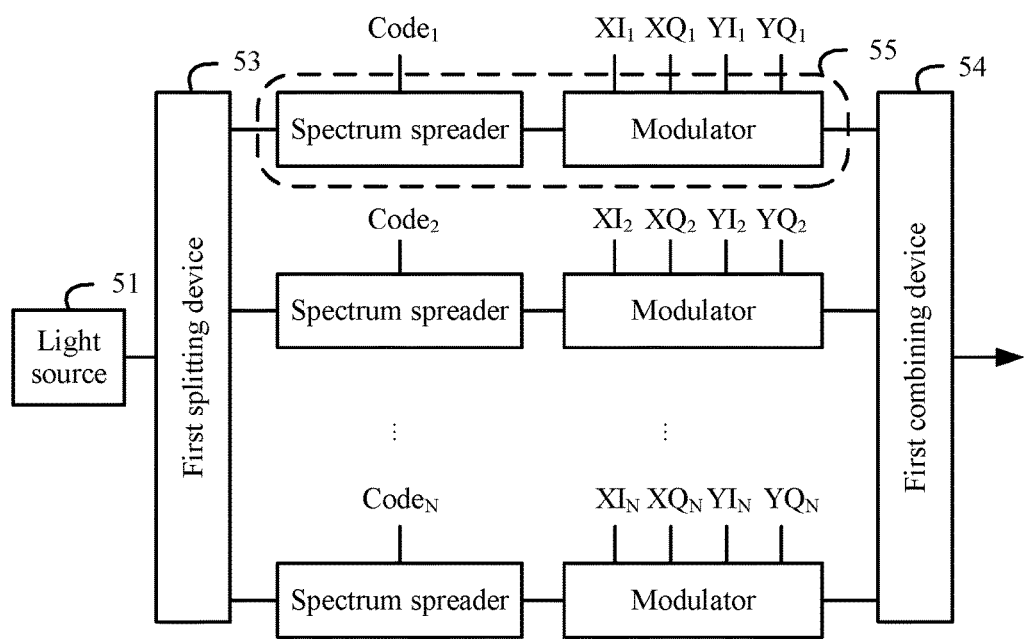
FIG. 7 is a schematic structural diagram of a second signal transmit device according to Embodiment 3 of the present invention.

Specifically, as shown in FIG. 6 or FIG. 7, any spread spectrum modulation device 55 may specifically include a modulator and a spectrum spreader.

The modulator may be configured to: perform, according to a low-speed data signal corresponding to the spread spectrum modulation device 55, data modulation on a subcarrier corresponding to the spread spectrum modulation device 55, and output a data modulation signal to the spectrum spreader. The spectrum spreader performs amplitude spread spectrum modulation on the data modulation signal according to a spreading code corresponding to the spread spectrum modulation device 55, and outputs a spread spectrum modulation signal to the first combining device 54 (details may be shown in FIG. 6). Alternatively, the modulator may be configured to: receive a spread spectrum signal obtained after the spectrum spreader performs, according to a spreading code corresponding to the spread spectrum modulation device 55, amplitude spread spectrum modulation on a subcarrier corresponding to the spread spectrum modulation device 55, perform data modulation on the spread spectrum signal according to a low-speed data signal corresponding to the spread spectrum modulation device 55, and output a spread spectrum modulation signal to the first combining device 54 (details may be shown in FIG. 7).

The spectrum spreader may be configured to: receive a data modulation signal obtained after the modulator performs, according to a low-speed data signal corresponding to the spread spectrum modulation device 55, data modulation on a subcarrier corresponding to the spread spectrum modulation device 55, perform amplitude spread spectrum modulation on the data modulation signal according to a spreading code corresponding to the spread spectrum modulation device 55, and output a spread spectrum modulation signal to the first combining device 54 (details may be shown in FIG. 6). Alternatively, the spectrum spreader may be configured to: perform, according to a spreading code corresponding to the spread spectrum modulation device 55, amplitude spread spectrum modulation on a subcarrier corresponding to the spread spectrum modulation device 55, and output a spread spectrum signal to the modulator. The modulator performs data modulation on the spread spectrum signal according to a low-speed data signal corresponding to the spread spectrum modulation device 55, and output a spread spectrum modulation signal to the first combining device 54 (details may be shown in FIG. 7).

Signals XI, XQ, YI, and YQ shown in FIG. 6 or FIG. 7 are low-speed data signals obtained after the deserializer 52 deserializes the high-speed data signal. Code is a corresponding spreading code. Details are not described in this embodiment of the present invention.

Further, it should be noted that a modulator included in each spread spectrum modulation device 55 may be PDM-QAM, single-polarization QAM, PAM, or the like. Certainly, the modulator may be any other modulation device that can implement corresponding data modulation. In addition, it should be noted that a spectrum spreader included in each spread spectrum modulation device 55 may be an MZM or the like. Certainly, the spectrum spreader may be any other spread spectrum device that can implement corresponding amplitude spread spectrum modulation (implement spectrum spreading by performing amplitude spread spectrum modulation on a subcarrier). Details are not described in this embodiment of the present invention.

Further, in this embodiment of the present invention, data modulation and spectrum spreading may be performed on any subcarrier that is used as a whole, to obtain a spread spectrum modulation signal. Alternatively, the subcarrier may be split into two tributary subcarriers for which data modulation and spectrum spreading are separately performed, to obtain two tributary spread spectrum modulation signals, and the two tributary spread spectrum modulation signals are combined and output, to obtain a spread spectrum modulation signal corresponding to the subcarrier.

That is, any of the N spread spectrum modulation devices 55 may be further specifically configured to:

split a subcarrier corresponding to the spread spectrum modulation device 55 into a first tributary subcarrier and a second tributary subcarrier, and separately perform phase shifting on the first tributary subcarrier and the second tributary subcarrier, so that a phase difference between the two tributary subcarriers is a specified value (the specified value may be flexibly set according to an actual case, for example, may be set to 180 degrees); and perform data modulation on the first tributary subcarrier according to a low-speed data signal corresponding to the spread spectrum modulation device 55, to obtain a first tributary data modulation signal, and perform amplitude spread spectrum modulation on the first tributary data modulation signal according to a spreading code corresponding to the spread spectrum modulation device 55, to obtain a first tributary spread spectrum modulation signal; perform data modulation on the second tributary subcarrier according to a low-speed data signal that is obtained after the phase reversion and that is corresponding to the spread spectrum modulation device 55, to obtain a second tributary data modulation signal, and perform amplitude spread spectrum modulation on the second tributary data modulation signal according to a spreading code that is obtained after the phase reversion and that is corresponding to the spread spectrum modulation device 55, to obtain a second tributary spread spectrum modulation signal; and combine the first tributary spread spectrum modulation signal and the second tributary spread spectrum modulation signal, to obtain a spread spectrum modulation signal corresponding to the spread spectrum modulation device 55, and output the spread spectrum modulation signal to the first combining device 54.

It should be noted that after splitting each of the N subcarriers into the first tributary subcarrier and the second tributary subcarrier, and separately performing phase shifting on the first tributary subcarrier and the second tributary subcarrier, so that the phase difference between the two tributary subcarriers is the specified value (the specified value may be flexibly set according to an actual case, for example, may be set to 180 degrees), the spread spectrum modulation device 55 may be further specifically configured to:

perform amplitude spread spectrum modulation on the first tributary subcarrier according to a spreading code corresponding to the spread spectrum modulation device 55, to obtain a first tributary spread spectrum signal, and perform data modulation on the first tributary spread spectrum signal according to a low-speed data signal corresponding to the spread spectrum modulation device 55, to obtain a first tributary spread spectrum modulation signal; perform amplitude spread spectrum modulation on the second tributary subcarrier according to a spreading code that is obtained after the phase reversion and that is corresponding to the spread spectrum modulation device 55, to obtain a second tributary spread spectrum signal, and perform data modulation on the second tributary spread spectrum signal according to a low-speed data signal that is obtained after the phase reversion and that is corresponding to the spread spectrum modulation device 55, to obtain a second tributary spread spectrum modulation signal; and combine the first tributary spread spectrum modulation signal and the second tributary spread spectrum modulation signal, to obtain a spread spectrum modulation signal corresponding to the spread spectrum modulation device 55, and output the spread spectrum modulation signal to the first combining device 54.

That is, a sequence of performing data modulation and amplitude spread spectrum modulation on each tributary subcarrier may flexibly change. This is not limited in this embodiment of the present invention.

Figure 8:
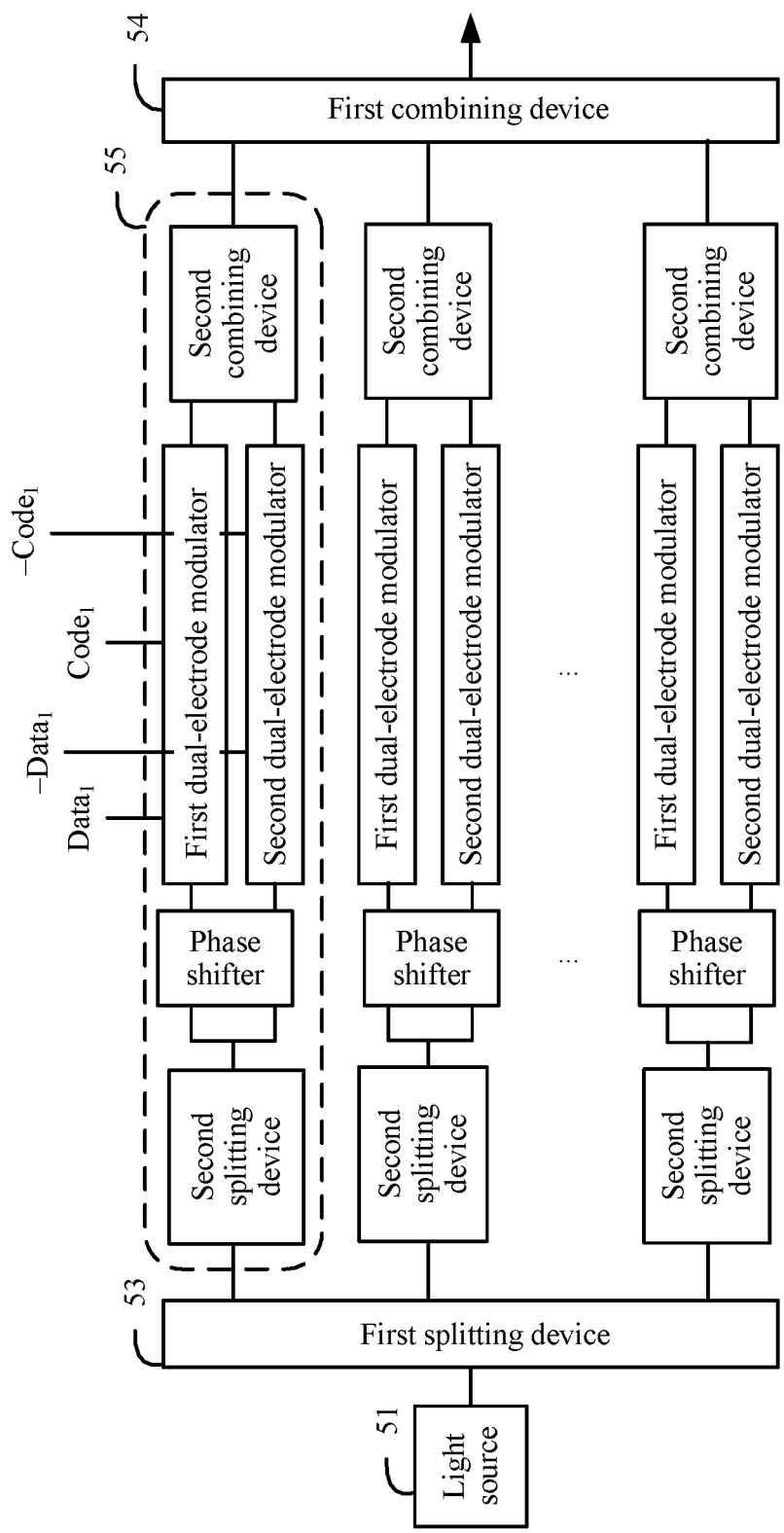
FIG. 8 is a schematic structural diagram of a third signal transmit device according to Embodiment 3 of the present invention.
Figure 9:
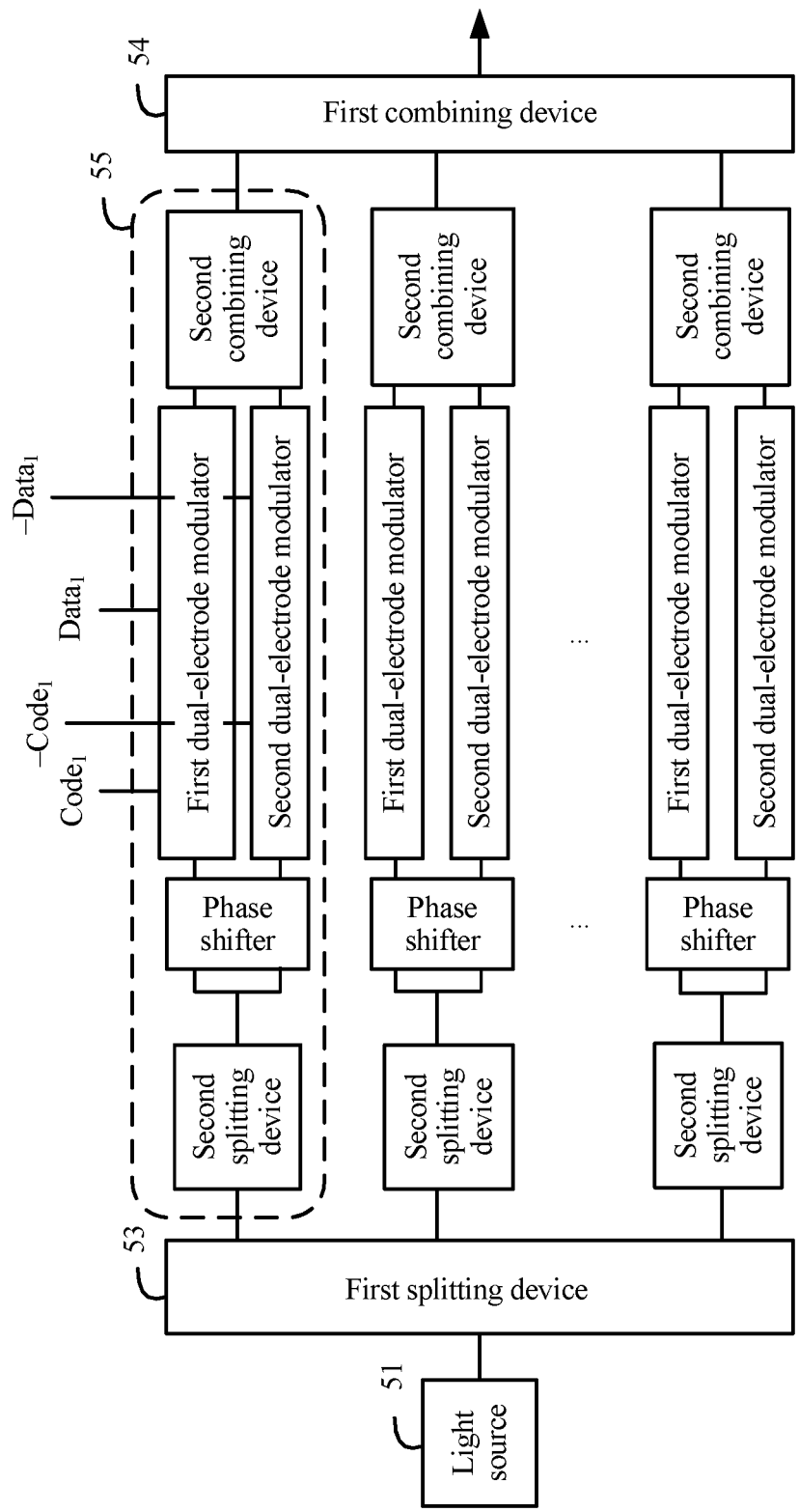
FIG. 9 is a schematic structural diagram of a fourth signal transmit device according to Embodiment 3 of the present invention.

Specifically, as shown in FIG. 8 or FIG. 9, in this case, the spread spectrum modulation device 55 may include a second splitting device, a phase shifter, a first dual-electrode modulator, a second dual-electrode modulator, and a second combining device.

The second splitting device may be configured to split a subcarrier corresponding to the spread spectrum modulation device 55 into a first tributary subcarrier and a second tributary subcarrier.

The phase shifter may be configured to separately perform phase shifting on the first tributary subcarrier and the second tributary subcarrier, so that a phase difference between the two tributary subcarriers is a specified value, for example, may be 180 degrees.

The first dual-electrode modulator may be configured to: perform data modulation on the first tributary subcarrier according to a low-speed data signal corresponding to the spread spectrum modulation device 55, to obtain a first tributary data modulation signal, and perform amplitude spread spectrum modulation on the first tributary data modulation signal according to a spreading code corresponding to the spread spectrum modulation device 55, to obtain a first tributary spread spectrum modulation signal (details may be shown in FIG. 8). Alternatively, the first dual-electrode modulator may be configured to: perform amplitude spread spectrum modulation on the first tributary subcarrier according to a spreading code corresponding to the spread spectrum modulation device 55, to obtain a first tributary spread spectrum signal, and perform data modulation on the first tributary spread spectrum signal according to a low-speed data signal corresponding to the spread spectrum modulation device 55, to obtain a first tributary spread spectrum modulation signal (details may be shown in FIG. 9).

The second dual-electrode modulator may be configured to: perform data modulation on the second tributary subcarrier according to a low-speed data signal that is obtained after the phase reversion and that is corresponding to the spread spectrum modulation device 55, to obtain a second tributary data modulation signal, and perform amplitude spread spectrum modulation on the second tributary data modulation signal according to a spreading code that is obtained after the phase reversion and that is corresponding to the spread spectrum modulation device 55, to obtain a second tributary spread spectrum modulation signal (details may be shown in FIG. 8). Alternatively, the second dual-electrode modulator may be configured to: perform amplitude spread spectrum modulation on the second tributary subcarrier according to a spreading code that is obtained after the phase reversion and that is corresponding to the spread spectrum modulation device 55, to obtain a second tributary spread spectrum signal, and perform data modulation on the second tributary spread spectrum signal according to a low-speed data signal that is obtained after the phase reversion and that is corresponding to the spread spectrum modulation device 55, to obtain a second tributary spread spectrum modulation signal (details may be shown in FIG. 9).

The second combining device may be configured to: combine the first tributary spread spectrum modulation signal and the second tributary spread spectrum modulation signal, to obtain a spread spectrum modulation signal corresponding to the spread spectrum modulation device 55, and output the spread spectrum modulation signal to the first combining device 54.

Signals XI, XQ, YI, and YQ shown in FIG. 8 or FIG. 9 are low-speed data signals obtained after the deserializer 52 deserializes the high-speed data signal. Code is a corresponding spreading code. Details are not described in this embodiment of the present invention.

Further, it should be noted that the second splitting device may be any splitting device that can split a corresponding subcarrier into two tributary subcarriers, for example, a coupler or a splitter, and the second combining device may be any combining device that can combine a first tributary spread spectrum modulation signal and a second tributary spread spectrum modulation signal into a spread spectrum modulation signal, for example, a coupler or a combiner.

In addition, it should be noted that the phase shifter may be any phase shifting device that can perform phase shifting on two tributary subcarriers of a subcarrier, so that the two tributary subcarriers have a specified phase difference (for example, the phase difference may be 180 degrees). For example, when a phase difference between two tributary subcarriers needs to be 180 degrees, a phase of a first tributary subcarrier of the two tributary subcarriers may be kept unchanged, and only a phase of a second tributary subcarrier of the two tributary subcarriers is shift by 180 degrees or −180 degrees; or a phase of a second tributary subcarrier of the two tributary subcarriers may be kept unchanged, and only a phase of a first tributary subcarrier of the two tributary subcarriers is shift by 180 degrees or −180 degrees; or certainly, a phase of a first tributary subcarrier of the two tributary subcarriers may be shift by 90 degrees, and a phase of a second tributary subcarrier is shift by −90 degrees; or a phase of a first tributary subcarrier of the two tributary subcarriers may be shift by −90 degrees, and a phase of a second tributary subcarrier is shift by 90 degrees, or the like. There is a need to ensure that the phase difference between the two tributary subcarriers is 180 degrees. Details are not described in this embodiment of the present invention.

Further, it should be noted that the first dual-electrode modulator and the second dual-electrode modulator may be any modulator that can perform both data modulation and amplitude modulation on a carrier by using a data signal and a spreading code, for example, an EAM. In addition, a sequence of performing data modulation and amplitude modulation on the carrier by the first dual-electrode modulator and the second dual-electrode modulator may flexibly change. Signals (a data signal, a spreading code, and the like) received through two electrodes used to receive corresponding signals need to interchange with each other. Details are not described in this embodiment of the present invention.

A working procedure of the spread spectrum modulation device 55 having a dual-electrode modulator is specifically described below by using data modulation and amplitude spread spectrum modulation performed on a subcarrier as an example.

When data modulation is performed on a first tributary subcarrier of the subcarrier, assuming that a power bias point during data modulation is P1, an expression of a first tributary data modulation signal obtained after data modulation is performed on the first tributary subcarrier of the subcarrier by using a first low-speed data signal corresponding to the subcarrier may be $(Data_1+P1)e^{j\omega t}$, and $e^{j\omega t}$ represents the subcarrier. Afterwards, if a power bias point during amplitude spread spectrum modulation is P2, an expression of a first tributary spread spectrum modulation signal obtained after amplitude spread spectrum modulation is performed on the first tributary data modulation signal by using a first spreading code (corresponding to the subcarrier may be $(Code_1+P2)(Data_1+P1)e^{j\omega t}$. Likewise, an expression of a second tributary spread spectrum modulation signal obtained after corresponding data modulation and corresponding amplitude spread spectrum modulation are performed on a second tributary subcarrier of the subcarrier by using a first low-speed data signal obtained after the phase reversion and a first spreading code obtained after the phase reversion may be $(-Code_1+P2)(-Data_1+P1)e^{j\omega t}$. Afterwards, the first tributary spread spectrum modulation signal and the second tributary spread spectrum modulation signal are combined, to obtain a spread spectrum modulation signal corresponding to the subcarrier. An expression of the spread spectrum modulation signal may be $(Code_1 \cdot Data_1 + P1 \cdot P2)e^{j\omega t}$, and $P1 \cdot P2$ is residual carrier power after data modulation and amplitude spread spectrum modulation. It can be learned that the combined spread spectrum modulation signal is a correct spread spectrum modulation signal. This further indicates that correct data modulation and correct spectrum spreading are implemented.

Further, the N spreading codes may be mutually orthogonal bipolar binary spread spectrum sequences.

Specifically, each of the N spreading codes may be a real number sequence such as a Walsh code or an OVSF code. Certainly, to obtain more-evenly distributed spectrums, each spreading code may be a sequence code generated by scrambling the real number sequence such as the Walsh code or the OVSF code based on a specified pseudo-random sequence code, or the like. This is not limited in this embodiment of the present invention.

It may be learned from the content in Embodiment 3 of the present invention that the signal transmit device may split the single-wavelength optical carrier transmitted by the light source into the N subcarriers with a same wavelength by using the first splitting device, and perform, by using the N spread spectrum modulation devices, corresponding data modulation and corresponding amplitude spread spectrum modulation on the N subcarriers by using the specified N spreading codes and the N low-speed data signals obtained after the deserializer deserializes the received high-speed data signal, to obtain the N spread spectrum modulation signals, and combine and output the N spread spectrum modulation signals by using the first combining device. Because a Baud rate of each data signal may be reduced through multiplexing, the data signal may be processed by using a low-speed DAC with a high ENOB and another electrical device with a low bandwidth, so as to effectively reduce quantization noise of the ADC and electrical noise of the another electrical device, and improve system performance of higher-order QAM modulation. In addition, in this solution, a multicarrier generation apparatus and a demultiplexer that have a relatively complex structure do not need to be used for optical carrier splitting, and spectrum spreading does not need to be performed in a phase modulation manner in which a plurality of delay units or controllable phase units are required. Therefore, system reliability is improved, and problems such as relatively high costs and a relatively great difficulty in implementation that exist in an existing manner of improving QAM system reliability are effectively resolved.

Embodiment 4

Figure 10:
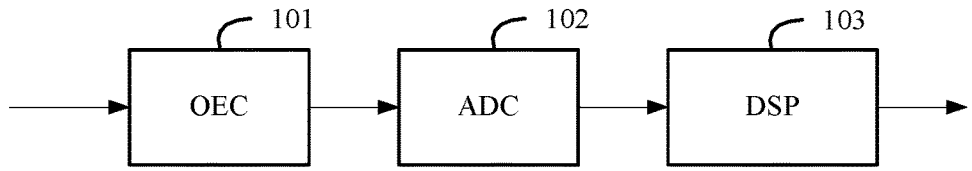
FIG. 10 is a schematic structural diagram of a signal receiving device according to Embodiment 4 of the present invention.

Based on an invention idea the same as that of Embodiment 2 of the present invention, Embodiment 4 of the present invention provides a signal receiving device. Specifically, as shown in FIG. 10, FIG. 10 is a schematic structural diagram of a signal receiving device according to Embodiment 4 of the present invention. It can be learned from FIG. 10 that the signal receiving device may include an OEC 101, an ADC 102, and a DSP 103.

The OEC 101 may be configured to: receive a signal transmitted by a signal transmit device, convert the received signal into an electrical signal, and output the electrical signal to the ADC 102. The signal transmit device splits, by using a splitting device, a single-wavelength optical carrier generated by a light source into N subcarriers with a same wavelength, performs data modulation and amplitude spread spectrum modulation on the N subcarriers based on N low-speed data signals and N spreading codes, to obtain N spread spectrum modulation signals, and the signal transmit device combines the N spread spectrum modulation signals, to obtain the signal.

The ADC 102 may be configured to: receive the electrical signal output by the OEC 101, convert the electrical signal into a digital signal, and output the digital signal to the DSP.

The DSP 103 may be configured to: receive the digital signal output by the ADC 102, despread the digital signal based on the N spreading codes, to obtain N despread signals, and perform low-pass filtering on each of the N despread signals, to obtain N data signals. N is a positive integer not less than 2.

That is, after optical-to-electrical conversion processing and analog-to-digital conversion processing are performed on the received signal, to obtain the digital signal, the digital signal may be despread based on the N spreading codes used by the signal transmit device for amplitude spread spectrum modulation, so as to improve accuracy of data recovery and receiving.

It should be noted that the N spreading codes may be mutually orthogonal bipolar binary spread spectrum sequences.

Specifically, each of the N spreading codes may be a real number sequence such as a Walsh code or an OVSF code. Certainly, to obtain more-evenly distributed spectrums, each spreading code may be a sequence code generated by scrambling the real number sequence such as the Walsh code or the OVSF code based on a specified pseudo-random sequence code, or the like. Details are not described herein.

Figure 11:
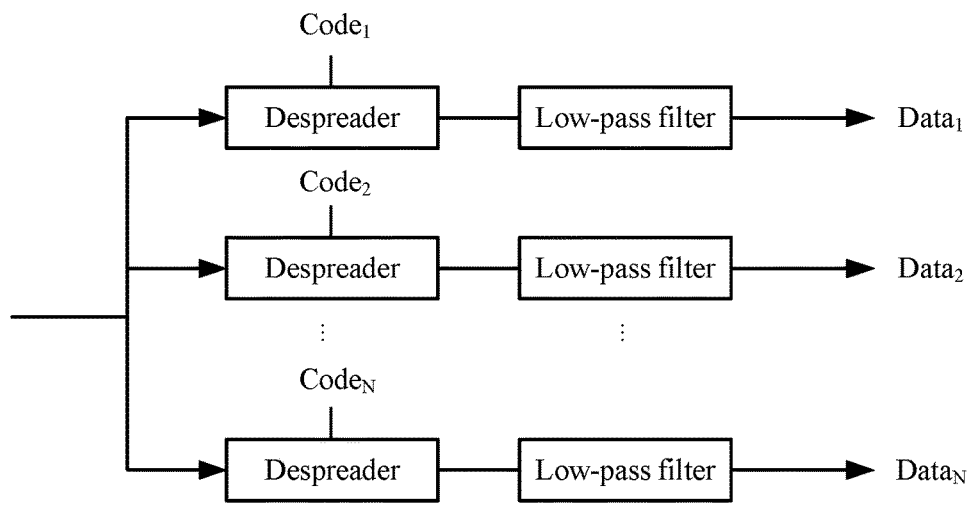
FIG. 11 is a schematic structural diagram of a first DSP according to Embodiment 4 of the present invention.

Specifically, as shown in FIG. 11, the DSP 103 may include N despreaders that are in a one-to-one correspondence with the N spreading codes, and N LPFs (Low-Pass Filter, low-pass filter) that are in a one-to-one correspondence with the N despreaders.

Each of the N despreaders may be configured to: despread the received digital signal according to a spreading code in the N spreading codes that is corresponding to the despreader, to obtain a despread signal, and output the despread signal to an LPF corresponding to the despreader.

Each of the N LPFs may be configured to: receive a despread signal output by a corresponding despreader, and perform low-pass filtering on the received despread signal, to obtain a data signal.

It should be noted that the despreader may be any despreading device that can despread a spread spectrum signal, for example, a multiplier. This is not limited in this embodiment of the present invention. Specifically, when the despreader is the multiplier, the despreader may despread the spread spectrum signal by multiplying the received signal by a corresponding spreading code, so as to improve accuracy of data recovery and receiving.

Figure 12:
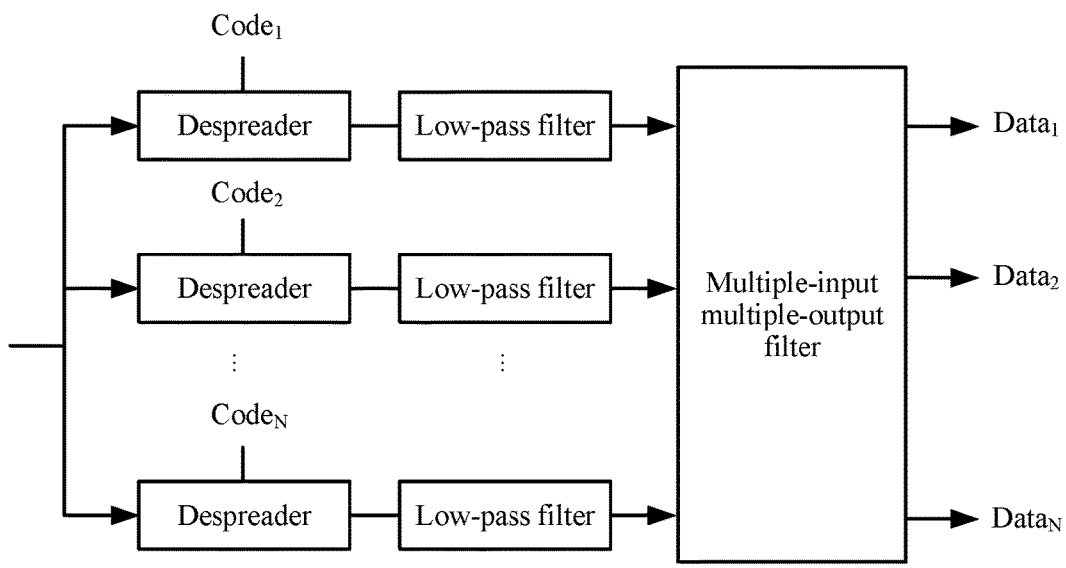
FIG. 12 is a schematic structural diagram of a second DSP according to Embodiment 4 of the present invention.

Further, orthogonality between CDMA spreading codes may be damaged because of dispersion of a fiber link, PMD, SOP rotation, nonlinearity, and the like. Consequently, multi-access crosstalk and the like are caused. Therefore, the DSP 103 in the signal receiving device may further implement multi-access crosstalk elimination and data recovery by using an implementation structure shown in FIG. 12.

That is, the DSP may further include a multiple-input multiple-output filter.

The multiple-input multiple-output filter may be configured to perform adaptive filtering on each of the N data signals (that is, data signals output by the N LPFs), to obtain N data signals obtained after the adaptive filtering, so as to improve accuracy of data recovery and receiving.

Specifically, the multiple-input multiple-output filter may be any filtering device that can perform adaptive filtering on a plurality of input signals to eliminate multi-access crosstalk, for example, a multiple-input multiple-output finite impulse response (MIMO FIR) filter. This is not limited in this embodiment of the present invention. A coefficient of the MIMO FIR filter may be obtained through calculation by using an algorithm such as a Constant Modulus Algorithm (CMA) or an Least Mean Square (LMS). Details are not described herein.

Figure 13:
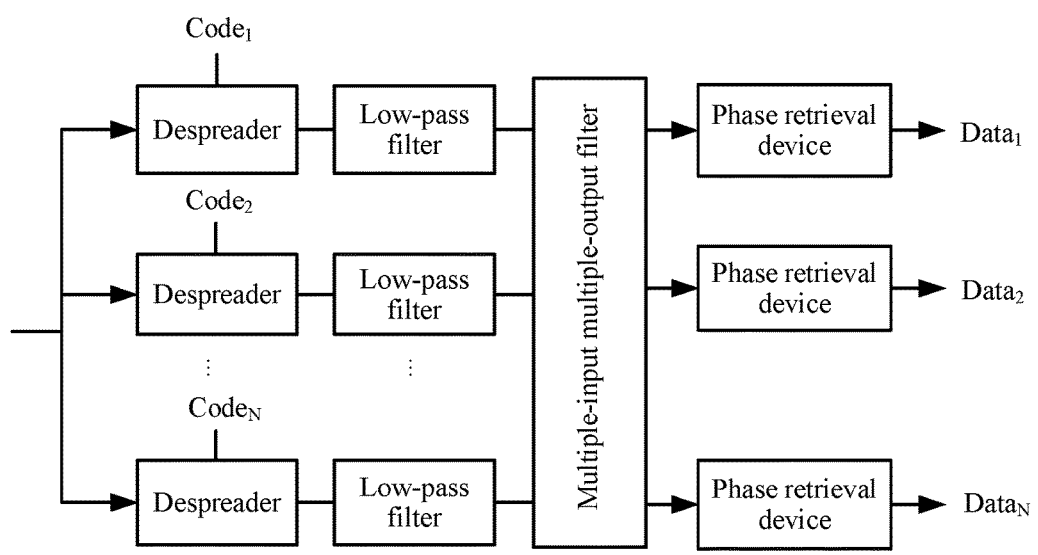
FIG. 13 is a schematic structural diagram of a third DSP according to Embodiment 4 of the present invention.

Further, as shown in FIG. 13, the DSP may further include N phase retrieval devices that are in a one-to-one correspondence with the N data signals obtained after the adaptive filtering.

Each of the N phase retrieval devices may be configured to perform carrier phase retrieval on a data signal that is obtained after the adaptive filtering and that is corresponding to the phase retrieval device, to obtain a data signal obtained after the carrier phase retrieval, so as to improve accuracy of data recovery and receiving.

Figure 14:
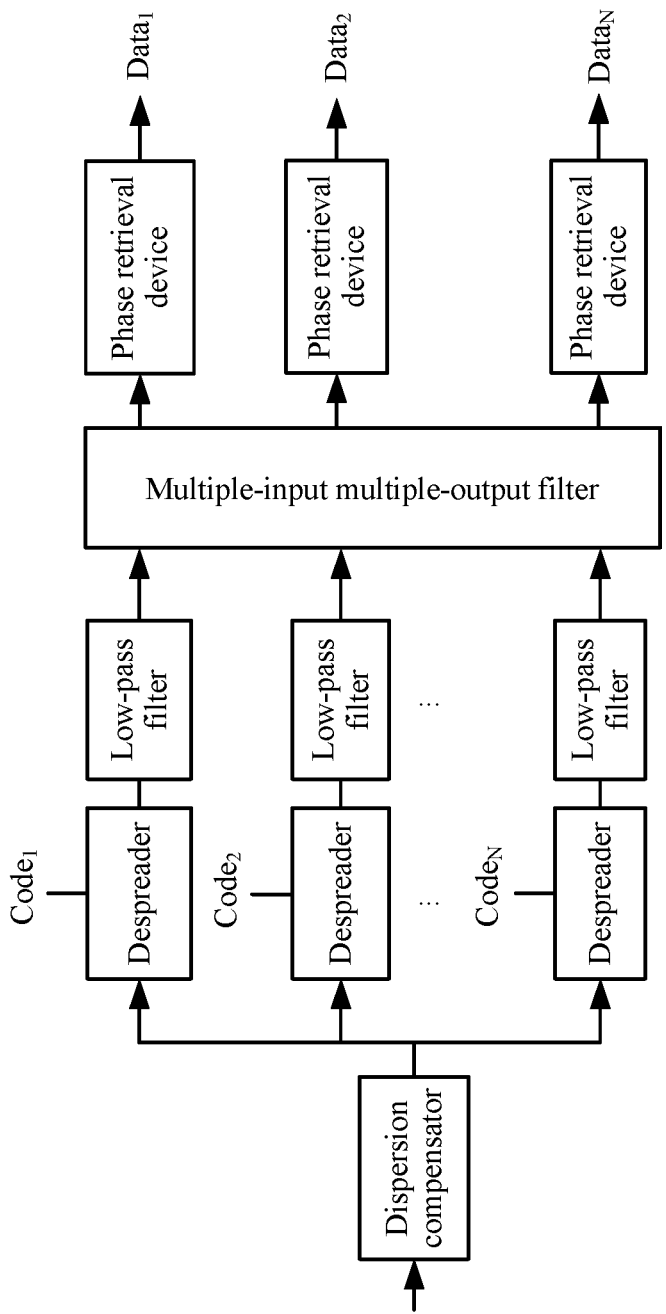
FIG. 14 is a schematic structural diagram of a fourth DSP according to Embodiment 4 of the present invention.

Further, as shown in FIG. 14, the DSP may further include a dispersion compensator, that is, a CDC (chromatic dispersion compensation).

The dispersion compensator may be configured to: perform dispersion compensation on the received digital signal before the received digital signal is despread, and output a digital signal obtained after the dispersion compensation to the N despreaders, to eliminate impact of dispersion on the digital signal, and improve accuracy of data recovery and receiving.

Embodiment 5

Figure 15:
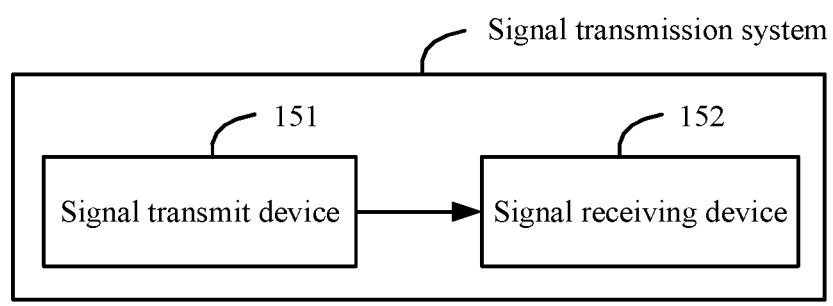
FIG. 15 is a schematic structural diagram of a signal transmission system according to Embodiment 5 of the present invention.

Based on an invention idea the same as that of Embodiment 3 of the present invention and that of Embodiment 4 of the present invention (or that of Embodiment 1 of the present invention and that of Embodiment 2 of the present invention), Embodiment 5 of the present invention provides a signal transmission system. Specifically, as shown in FIG. 15, the signal transmission system may include a signal transmit device 151 and a signal receiving device 152.

The signal transmit device 151 is configured to: generate a single-wavelength optical carrier; split the single-wavelength optical carrier into N subcarriers with a same wavelength based on a splitting device; perform data modulation and amplitude spread spectrum modulation on the N subcarriers according to N low-speed data signals and N spreading codes, to obtain N spread spectrum modulation signals; combine the obtained N spread spectrum modulation signals into a combined signal; and output the combined signal to the signal receiving device 152. A value of N is a positive integer not less than 2, the N spreading codes are in a one-to-one correspondence with the N subcarriers, the N low-speed data signals are in a one-to-one correspondence with the N subcarriers, and the N low-speed data signals are obtained by deserializing a received high-speed data signal.

The signal receiving device 152 is configured to: receive a signal transmitted by the signal transmit device 151; perform optical-to-electrical conversion processing and analog-to-digital conversion processing on the received signal, to obtain a digital signal; despread the digital signal based on the N spreading codes, to obtain N despread signals; and perform low-pass filtering on each of the N despread signals, to obtain N data signals.

It should be noted that for specific structures and working procedures of the signal transmit device and the signal receiving device, refer to the related descriptions in Embodiment 1 and Embodiment 2 (or Embodiment 3 and Embodiment 4). Details are not described herein again.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the protection scope defined by the following claims and their equivalent technologies.

What is claimed is:

1. A signal transmitting method, comprising:
generating a single-wavelength optical carrier;
splitting the single-wavelength optical carrier into N subcarriers with a same wavelength based on a splitting device, wherein a value of N is a positive integer not less than 2;
performing data modulation and amplitude spread spectrum modulation on the N subcarriers according to N low-speed data signals and N spreading codes, to obtain N spread spectrum modulation signals, wherein the N spreading codes are in a one-to-one correspondence with the N subcarriers, the N low-speed data signals are in a one-to-one correspondence with the N subcarriers, and the N low-speed data signals are obtained by deserializing a received high-speed data signal;
splitting each of the N subcarriers into a first tributary subcarrier and a second tributary subcarrier, and separately performing phase shifting on the first tributary subcarrier and the second tributary subcarrier;
performing data modulation and amplitude spread spectrum modulation on each of the first and second tributary subcarriers to obtain first and second tributary spread spectrum modulation signals of each of the N subcarriers;
combining the first and second tributary spread spectrum modulation signals to obtain a spread spectrum modulation signal corresponding to the subcarrier; and
combining the obtained N spread spectrum modulation signals into a combined signal for outputting.

2. The signal transmitting method according to claim 1, wherein the performing data modulation and amplitude spread spectrum modulation on the N subcarriers according to N low-speed data signals and N spreading codes, to obtain N spread spectrum modulation signals comprises:
performing data modulation on each of the N subcarriers according to a low-speed data signal corresponding to the subcarrier, to obtain a data modulation signal; and
performing amplitude spread spectrum modulation on the data modulation signal according to a spreading code corresponding to the subcarrier, to obtain a spread spectrum modulation signal corresponding to the subcarrier.

3. The signal transmitting method according to claim 1, wherein the performing data modulation and amplitude spread spectrum modulation on the N subcarriers according to N low-speed data signals and N spreading codes, to obtain N spread spectrum modulation signals comprises:
performing amplitude spread spectrum modulation on each of the N subcarriers according to a spreading code corresponding to the subcarrier, to obtain a spread spectrum signal; and
performing data modulation on the spread spectrum signal according to a low-speed data signal corresponding to the subcarrier, to obtain a spread spectrum modulation signal corresponding to the subcarrier.

4. The signal transmitting method according to claim 1, wherein the performing data modulation and amplitude spread spectrum modulation on the N subcarriers according to N low-speed data signals and N spreading codes, to obtain N spread spectrum modulation signals comprises:
performing data modulation on the first tributary subcarrier according to a low-speed data signal corresponding to the subcarrier, to obtain a first tributary data modulation signal, and performing amplitude spread spectrum modulation on the first tributary data modulation signal according to a spreading code corresponding to the subcarrier, to obtain a first tributary spread spectrum modulation signal; and performing data modulation on the second tributary subcarrier according to a low-speed data signal that is obtained after the phase reversion and that is corresponding to the subcarrier, to obtain a second tributary data modulation signal, and performing amplitude spread spectrum modulation on the second tributary data modulation signal according to a spreading code that is obtained after the phase reversion and that is corresponding to the subcarrier, to obtain a second tributary spread spectrum modulation signal.

5. The signal transmitting method according to claim 1, wherein the performing data modulation and amplitude spread spectrum modulation on the N subcarriers according to N low-speed data signals and N spreading codes, to obtain N spread spectrum modulation signals comprises:

performing amplitude spread spectrum modulation on the first tributary subcarrier according to a spreading code corresponding to the subcarrier, to obtain a first tributary spread spectrum signal, and performing data modulation on the first tributary spread spectrum signal according to a low-speed data signal corresponding to the subcarrier, to obtain a first tributary spread spectrum modulation signal; and performing amplitude spread spectrum modulation on the second tributary subcarrier according to a spreading code that is obtained after the phase reversion and that is corresponding to the subcarrier, to obtain a second tributary spread spectrum signal, and performing data modulation on the second tributary spread spectrum signal according to a low-speed data signal that is obtained after the phase reversion and that is corresponding to the subcarrier, to obtain a second tributary spread spectrum modulation signal.

6. A signal receiving method, comprising:

receiving a signal transmitted by a signal transmit device, wherein the received signal from the transmit device was generated by the signal transmit device splitting a generated single-wavelength optical carrier into N subcarriers with a same wavelength by using a splitting device, and performing data modulation and amplitude spread spectrum modulation on the N subcarriers based on N low-speed data signals and N spreading codes, the performing data modulation and amplitude spread spectrum modulation on each of the N subcarriers including splitting each of the N subcarriers into a first tributary subcarrier and a second tributary subcarrier and separately performing data modulation and amplitude spread spectrum modulation on each of the first and second tributary subcarriers of each of the N subcarriers to obtain first and second tributary spread spectrum modulation signals, and combining the first and second tributary spread spectrum modulation signals to obtain N spread spectrum modulation signals, and the signal transmit device combines the N spread spectrum modulation signals, to obtain the signal;

performing optical-to-electrical conversion processing and analog-to-digital conversion processing on the received signal, to obtain a digital signal; and despreading the digital signal based on the N spreading codes, to obtain N despread signals, and performing low-pass filtering on each of the N despread signals, to obtain N data signals, wherein N is a positive integer not less than 2.

7. The signal receiving method according to claim 6, wherein the method further comprises:

performing adaptive filtering on each of the N data signals, to obtain N data signals obtained after the adaptive filtering.

8. The signal receiving method according to claim 7, wherein the method further comprises:

performing carrier phase retrieval on each of the N data signals obtained after the adaptive filtering, to obtain N data signals obtained after the carrier phases retrieval.

9. The signal receiving method according to claim 6, wherein before the despreading the digital signal, the method further comprises:

performing dispersion compensation on the digital signal.

10. A signal transmit device, wherein the device comprises a light source, a deserializer, a first splitting device, a first combining device, and N spread spectrum modulation devices; and a value of N is a positive integer not less than 2, wherein the light source is configured to: generate a single-wavelength optical carrier, and output the single-wavelength optical carrier to the first splitting device;

the deserializer is configured to: deserialize a received high-speed data signal into N low-speed data signals, and output the N low-speed data signals to the N spread spectrum modulation devices, wherein the N low-speed data signals are in a one-to-one correspondence with the N spread spectrum modulation devices;

the first splitting device is configured to: split the single-wavelength optical carrier generated by the light source into N subcarriers with a same wavelength, and output the N subcarriers to the N spread spectrum modulation devices, wherein the N subcarriers are in a one-to-one correspondence with the N spread spectrum modulation devices;

each of the N spread spectrum modulation devices is configured to: respectively perform, according to a low-speed data signal corresponding to the spread spectrum modulation device and a spreading code in N spreading codes that is corresponding to the spread spectrum modulation device, data modulation and amplitude spread spectrum modulation on a subcarrier corresponding to the spread spectrum modulation device, to obtain a spread spectrum modulation signal corresponding to the spread spectrum modulation device, and output the spread spectrum modulation signal to the first combining device, wherein the N spreading codes are in a one-to-one correspondence with the N spread spectrum modulation devices;

any of the N spread spectrum modulation devices is configured to:

split a subcarrier corresponding to the spread spectrum modulation device into a first tributary subcarrier and a second tributary subcarrier, and separately perform phase shifting on the first tributary subcarrier and the second tributary subcarrier;

perform data modulation and amplitude spread spectrum modulation on each of the first and second tributary subcarriers to obtain first and second tributary spread spectrum modulation signals of each of the N subcarriers;

combine the first and second tributary spread spectrum modulation signals to obtain a spread spectrum modulation signal corresponding to the spread spectrum modulation device, and output the spread spectrum modulation signal to the first combining device; and the first combining device is configured to combine N spread spectrum modulation signals received from the N spread spectrum modulation devices into a combined signal for outputting.

11. The signal transmit device according to claim 10, wherein any of the N spread spectrum modulation devices is configured to:

perform, according to a low-speed data signal corresponding to the spread spectrum modulation device, data modulation on a subcarrier corresponding to the spread spectrum modulation device, to obtain a data modulation signal, perform amplitude spread spectrum modulation on the data modulation signal according to a spreading code corresponding to the spread spectrum modulation device, to obtain a spread spectrum modulation signal corresponding to the spread spectrum modulation device, and output the spread spectrum modulation signal to the first combining device.

12. The signal transmit device according to claim 10, wherein any of the N spread spectrum modulation devices is configured to:

perform, according to a spreading code corresponding to the spread spectrum modulation device, amplitude spread spectrum modulation on a subcarrier corresponding to the spread spectrum modulation device, to obtain a spread spectrum signal, perform data modulation on the spread spectrum signal according to a low-speed data signal corresponding to the spread spectrum modulation device, to obtain a spread spectrum modulation signal corresponding to the spread spectrum modulation device, and output the spread spectrum modulation signal to the first combining device.

13. The signal transmit device according to claim 10, wherein any of the N spread spectrum modulation devices is further configured to:

perform data modulation on the first tributary subcarrier according to a low-speed data signal corresponding to the spread spectrum modulation device, to obtain a first tributary data modulation signal, and perform amplitude spread spectrum modulation on the first tributary data modulation signal according to a spreading code corresponding to the spread spectrum modulation device, to obtain a first tributary spread spectrum modulation signal; and perform data modulation on the second tributary subcarrier according to a low-speed data signal that is obtained after the phase reversion and that is corresponding to the spread spectrum modulation device, to obtain a second tributary data modulation signal, and perform amplitude spread spectrum modulation on the second tributary data modulation signal according to a spreading code that is obtained after the phase reversion and that is corresponding to the spread spectrum modulation device, to obtain a second tributary spread spectrum modulation signal.

14. The signal transmit device according to claim 10, wherein any of the N spread spectrum modulation devices is further configured to:

perform amplitude spread spectrum modulation on the first tributary subcarrier according to a spreading code corresponding to the spread spectrum modulation device, to obtain a first tributary spread spectrum signal, and perform data modulation on the first tributary spread spectrum signal according to a low-speed data signal corresponding to the spread spectrum modulation device, to obtain a first tributary spread spectrum modulation signal; and perform amplitude spread spectrum modulation on the second tributary subcarrier according to a spreading code that is obtained after the phase reversion and that is corresponding to the spread spectrum modulation device, to obtain a second tributary spread spectrum signal, and perform data modulation on the second tributary spread spectrum signal according to a low-speed data signal that is obtained after the phase reversion and that is corresponding to the spread spectrum modulation device, to obtain a second tributary spread spectrum modulation signal.

15. The signal transmit device according to claim 10, wherein the N spreading codes are mutually orthogonal bipolar binary spread spectrum sequences.

16. A signal receiving device, comprising an optical-to-electrical converter OEC, an analog to digital converter ADC, and a digital signal processor DSP, wherein the OEC is configured to: receive a signal transmitted by a signal transmit device, convert the received signal into an electrical signal, and output the electrical signal to the ADC, wherein the signal transmit device splits, by using a splitting device, a single-wavelength optical carrier generated by a light source into N subcarriers with a same wavelength, performs data modulation and amplitude spread spectrum modulation on the N subcarriers based on N low-speed data signals and N spreading codes, the performing data modulation and amplitude spread spectrum modulation on each of the N subcarriers includes splitting each of the N subcarriers into a first tributary subcarrier and a second tributary subcarrier and separately performing data modulation and amplitude spread spectrum modulation on each of the first and second tributary subcarriers of each of the N subcarriers to obtain first and second tributary spread spectrum modulation signals, and combining the first and second tributary spread spectrum modulation signals to obtain N spread spectrum modulation signals, and the signal transmit device combines the N spread spectrum modulation signals, to obtain the signal;

the ADC is configured to: receive the electrical signal output by the OEC, convert the electrical signal into a digital signal, and output the digital signal to the DSP; and the DSP is configured to: receive the digital signal output by the ADC, despread the digital signal based on the N spreading codes, to obtain N despread signals, and perform low-pass filtering on each of the N despread signals, to obtain N data signals, wherein N is a positive integer not less than 2.

17. The signal receiving device according to claim 16, wherein the DSP further comprises a multiple-input multiple-output filter, wherein the multiple-input multiple-output filter is configured to perform adaptive filtering on each of the N data signals, to obtain N data signals obtained after the adaptive filtering.

18. The signal receiving device according to claim 16, wherein the DSP further comprises N phase retrieval devices that are in a one-to-one correspondence with the N data signals obtained after the adaptive filtering, wherein each of the N phase retrieval devices is configured to perform carrier phase retrieval on a data signal that is obtained after the adaptive filtering and that is corresponding to the phase retrieval device, to obtain a data signal obtained after the carrier phase retrieval.

19. The signal receiving device according to claim 16, wherein the DSP further comprises a dispersion compensator, wherein the dispersion compensator is configured to: perform dispersion compensation on the received digital signal before the received digital signal is despread, and output a digital signal obtained after the dispersion compensation to the N despreaders.

* * * * *